United States Patent
Li

(10) Patent No.: US 10,921,992 B2
(45) Date of Patent: Feb. 16, 2021

(54) METHOD AND SYSTEM FOR DATA PLACEMENT IN A HARD DISK DRIVE BASED ON ACCESS FREQUENCY FOR IMPROVED IOPS AND UTILIZATION EFFICIENCY

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 296 days.

(21) Appl. No.: 16/017,608

(22) Filed: Jun. 25, 2018

(65) Prior Publication Data

US 2019/0391748 A1    Dec. 26, 2019

(51) Int. Cl.
| | | |
|---|---|---|
| *G11B 5/09* | (2006.01) | |
| *G06F 3/06* | (2006.01) | |
| *G06F 12/02* | (2006.01) | |
| *G11B 20/18* | (2006.01) | |

(52) U.S. Cl.
CPC ............ *G06F 3/0619* (2013.01); *G06F 3/068* (2013.01); *G06F 3/0644* (2013.01); *G06F 12/0238* (2013.01); *G11B 20/1889* (2013.01)

(58) Field of Classification Search
None
See application file for complete search history.

(56) References Cited

U.S. PATENT DOCUMENTS

| | | |
|---|---|---|
| 3,893,071 A | 7/1975 | Bossen |
| 4,562,494 A | 12/1985 | Bond |
| 4,718,067 A | 1/1988 | Peters |
| | (Continued) | |

FOREIGN PATENT DOCUMENTS

| | | |
|---|---|---|
| JP | 2003022209 | 1/2003 |
| JP | 2011175422 | 9/2011 |
| | (Continued) | |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Peter Vincent Agustin
(74) *Attorney, Agent, or Firm* — Shun Yao; Park, Vaughan, Fleming & Dowler LLP

(57) ABSTRACT

One embodiment facilitates a write operation in a shingled magnetic recording device. During operation, the system receives, by the storage device, data to be written to the storage device and access-frequency information associated with the data, wherein the storage device includes a plurality of concentric tracks. The system distributes a plurality of spare sector pools among the plurality of concentric tracks. The system selects a track onto which to write the data based on the access-frequency information, wherein data with a highest access-frequency is written to an outer track. The system appends the data at a current write pointer location of the selected track, thereby facilitating an enhanced data placement for subsequent access in the storage device.

18 Claims, 16 Drawing Sheets

(56) References Cited

U.S. PATENT DOCUMENTS

| | | | |
|---|---|---|---|
| 4,775,932 A | 10/1988 | Oxley | |
| 4,858,040 A | 8/1989 | Hazebrouck | |
| 5,394,382 A * | 2/1995 | Hu | G11B 20/1258 |
| | | | 360/73.03 |
| 5,602,693 A | 2/1997 | Brunnett | |
| 5,732,093 A | 3/1998 | Huang | |
| 5,802,551 A * | 9/1998 | Komatsu | G11C 29/76 |
| | | | 711/103 |
| 5,930,167 A | 7/1999 | Lee | |
| 6,098,185 A * | 8/2000 | Wilson | G11B 27/3027 |
| | | | 360/25 |
| 6,148,377 A | 11/2000 | Carter | |
| 6,226,650 B1 | 5/2001 | Mahajan et al. | |
| 6,457,104 B1 * | 9/2002 | Tremaine | G06F 12/023 |
| | | | 709/213 |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 * | 10/2009 | Bombet | G11B 5/09 |
| | | | 360/31 |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,825,937 B2 | 9/2014 | Atkisson | |
| 8,868,825 B1 | 10/2014 | Hayes | |
| 8,904,061 B1 | 12/2014 | O'Brien, III | |
| 9,015,561 B1 | 4/2015 | Hu | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 * | 9/2015 | Fallone | G11B 5/012 |
| 9,141,176 B1 | 9/2015 | Chen | |
| 9,208,817 B1 | 12/2015 | Li | |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,529,601 B1 | 12/2016 | Dharmadhikari | |
| 9,588,698 B1 | 3/2017 | Karamcheti | |
| 9,588,977 B1 | 3/2017 | Wang | |
| 9,607,631 B2 | 3/2017 | Rausch | |
| 9,747,202 B1 | 8/2017 | Shaharabany | |
| 9,852,076 B1 | 12/2017 | Garg | |
| 9,875,053 B2 | 1/2018 | Frid | |
| 9,946,596 B2 | 4/2018 | Hashimoto | |
| 10,013,169 B2 | 7/2018 | Fisher | |
| 10,199,066 B1 * | 2/2019 | Feldman | G11B 5/59633 |
| 10,229,735 B1 | 3/2019 | Natarajan | |
| 10,235,198 B2 | 3/2019 | Qiu | |
| 10,318,467 B2 | 6/2019 | Barzik | |
| 10,361,722 B2 | 7/2019 | Lee | |
| 10,437,670 B1 | 10/2019 | Koltsidas | |
| 10,642,522 B2 | 5/2020 | Li | |
| 10,649,657 B2 | 5/2020 | Zaidman | |
| 2001/0032324 A1 | 10/2001 | Slaughter | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0161890 A1 | 10/2002 | Chen | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0156012 A1 | 7/2006 | Beeson | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0283081 A1 | 12/2007 | Lasser | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0301532 A1 | 12/2008 | Uchikawa | |
| 2009/0006667 A1 | 1/2009 | Lin | |
| 2009/0089544 A1 | 4/2009 | Liu | |
| 2009/0113219 A1 | 4/2009 | Aharonov | |
| 2009/0183052 A1 | 7/2009 | Kanno | |
| 2009/0282275 A1 | 11/2009 | Yermalayeu | |
| 2009/0287956 A1 * | 11/2009 | Flynn | G06F 11/1008 |
| | | | 714/6.12 |
| 2009/0307249 A1 | 12/2009 | Koifman | |
| 2009/0310412 A1 | 12/2009 | Jang | |
| 2010/0169470 A1 | 7/2010 | Takashige | |
| 2010/0217952 A1 | 8/2010 | Iyer | |
| 2010/0229224 A1 | 9/2010 | Etchegoyen | |
| 2010/0325367 A1 | 12/2010 | Kornegay | |
| 2010/0332922 A1 | 12/2010 | Chang | |
| 2011/0031546 A1 | 2/2011 | Uenaka | |
| 2011/0055458 A1 | 3/2011 | Kuehne | |
| 2011/0055471 A1 | 3/2011 | Thatcher | |
| 2011/0099418 A1 | 4/2011 | Chen | |
| 2011/0153903 A1 | 6/2011 | Hinkle | |
| 2011/0161784 A1 | 6/2011 | Selinger | |
| 2011/0191525 A1 | 8/2011 | Hsu | |
| 2011/0218969 A1 | 9/2011 | Anglin | |
| 2011/0231598 A1 | 9/2011 | Hatsuda | |
| 2011/0239083 A1 | 9/2011 | Kanno | |
| 2011/0252188 A1 | 10/2011 | Weingarten | |
| 2011/0258514 A1 | 10/2011 | Lasser | |
| 2011/0292538 A1 | 12/2011 | Haga | |
| 2011/0299317 A1 | 12/2011 | Shaeffer | |
| 2011/0302353 A1 | 12/2011 | Confalonieri | |
| 2012/0084523 A1 | 4/2012 | Littlefield | |
| 2012/0089774 A1 * | 4/2012 | Kelkar | G11B 19/045 |
| | | | 711/106 |
| 2012/0096330 A1 | 4/2012 | Przybylski | |
| 2012/0117399 A1 | 5/2012 | Chan | |
| 2012/0147021 A1 | 6/2012 | Cheng | |
| 2012/0159099 A1 | 6/2012 | Lindamood | |
| 2012/0159289 A1 | 6/2012 | Piccirillo | |
| 2012/0173792 A1 | 7/2012 | Lassa | |
| 2012/0203958 A1 | 8/2012 | Jones | |
| 2012/0210095 A1 | 8/2012 | Nellans | |
| 2012/0246392 A1 | 9/2012 | Cheon | |
| 2012/0278579 A1 | 11/2012 | Goss | |
| 2012/0284587 A1 | 11/2012 | Yu | |
| 2012/0331207 A1 | 12/2012 | Lassa | |
| 2013/0024605 A1 | 1/2013 | Sharon | |
| 2013/0054822 A1 | 2/2013 | Mordani | |
| 2013/0061029 A1 | 3/2013 | Huff | |
| 2013/0073798 A1 | 3/2013 | Kang | |
| 2013/0080391 A1 | 3/2013 | Raichstein | |
| 2013/0145085 A1 | 6/2013 | Yu | |
| 2013/0145089 A1 | 6/2013 | Eleftheriou | |
| 2013/0151759 A1 | 6/2013 | Shim | |
| 2013/0159251 A1 | 6/2013 | Skrenta | |

(56) References Cited

U.S. PATENT DOCUMENTS

| | | |
|---|---|---|
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0254622 A1 | 9/2013 | Kanno |
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1* | 4/2015 | Feng ............... G06F 3/06 711/171 |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1 | 8/2015 | Moore |
| 2015/0269964 A1* | 9/2015 | Fallone ............. G11B 20/1889 360/49 |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets et al. |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1* | 8/2017 | Matsuo ............... G06F 11/2017 |
| 2017/0228157 A1 | 8/2017 | Yang |
| 2017/0242722 A1 | 8/2017 | Qiu |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0143780 A1 | 5/2018 | Cho |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1 | 2/2019 | Jean |
| 2019/0073262 A1 | 3/2019 | Chen |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1* | 12/2019 | Li ........................ G06F 3/0644 |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0097189 A1 | 3/2020 | Tao |
| 2020/0159425 A1 | 5/2020 | Flynn |

FOREIGN PATENT DOCUMENTS

| | | |
|---|---|---|
| WO | 9418634 | 8/1994 |
| WO | 1994018634 | 8/1994 |

OTHER PUBLICATIONS

EMC Powerpath Load Balancing and Failover Comparison with native MPIO operating system solutions. Feb. 2011.

(56) References Cited

OTHER PUBLICATIONS

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

https://web.archive.org/web/20071130235034/http://en.wikipedia.org:80/wiki/logical_block_addressing wikipedia screen shot retriefed on wayback Nov 20, 2007 showing both physical and logical addressing used historically to access data on storage devices (Year: 2007).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. lenne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

\* cited by examiner

METHOD AND SYSTEM FOR DATA PLACEMENT IN A HARD DISK DRIVE BASED ON ACCESS FREQUENCY FOR IMPROVED IOPS AND UTILIZATION EFFICIENCY

BACKGROUND

Field

This disclosure is generally related to the field of data storage. More specifically, this disclosure is related to a method and system for data placement in a hard disk drive (HDD) based on access frequency for improved input/output per second (IOPS) and utilization efficiency.

Related Art

The proliferation of the Internet and e-commerce continues to create a vast amount of digital content. Various storage systems have been created to access and store such digital content. A storage system or server can include multiple drives, such as hard disk drives (HDDs) and solid state drives (SSDs). The memory in a server plays a crucial role in the performance and capacity of a storage system. In the current economy, HDDs are significantly less expensive than SSDs. The capacity of HDDs continues to increase, which results in a reduced cost in the storage capacity per unit (e.g., $/GB). However, due to limitations on the mechanisms of HDDs, the input/output operations per second (IOPS) of an HDD has not increased along with the capacity. This has resulted in a reduced performance per unit (e.g., IOPS/GB).

Current solutions include a shingled magnetic recording (SMR) drive, heat-assisted magnetic recording (HAMR) devices, and microwave-assisted magnetic recording (MAMR) devices. However, while these devices provide an increased areal density for storage, and thus result in a reduced storage capacity cost (in $/GB), the overall TOPS in these devices has not correspondingly increased. Not only do these current solutions involve a reduced performance per unit (in IOPS/GB), but an application may only be able to use part of the entire capacity of an HDD. That is, an application cannot utilize the entirety of the increased storage capacity of the HDD. This can decrease the efficiency of the HDD as well as the overall efficiency and performance of the storage system.

SUMMARY

One embodiment facilitates data placement in a storage device. During operation, the system receives, by the storage device, data to be written to the storage device and access-frequency information associated with the data, wherein the storage device includes a plurality of concentric tracks. The system distributes a plurality of spare sector pools among the plurality of concentric tracks. The system selects a track onto which to write the data based on the access-frequency information, wherein data with a highest access-frequency is written to an outer track. The system appends the data at a current write pointer location of the selected track, thereby facilitating an enhanced data placement for subsequent access in the storage device.

In some embodiments, in response to determining an update to corresponding data in a first sector of the selected track, the system: marks the method further comprises: marks the first sector as invalid; invalidates a mapping of the corresponding data to a physical address for the first sector; and updates the mapping of the corresponding data to a physical address for a new sector which is sequentially located at the current write pointer location.

In some embodiments, in response to determining that a second sector at the current write pointer location is a defective sector, the system: marks the second sector as defective; and writes the data to a next sequentially available sector of the selected track.

In some embodiments, in response to determining that the storage drive is not currently processing a request from a host, the system: initiates a data recycling procedure; and makes available for storage tracks which include sectors marked as invalid, defective, or pending.

In some embodiments, the storage device is a hard disk drive. The system initiates, by a controller of a solid state drive coupled to the hard disk drive, a garbage collection process. The system packs, by the controller of the solid state drive, valid data into a block. The system transmits, by the controller of the solid state drive, the block of valid data, which is received by the storage device as the data to be written to the storage device.

In some embodiments, the system receives a request to read data from the storage device. The system identifies a track from which to read the requested data. The system moves a read head of the storage drive to the identified track. The system retrieves data from an entirety of the identified track starting from a current location of the read head. The system reads the data starting from a beginning sector of the retrieved data.

In some embodiments, the system aligns the retrieved data from the identified track by marking the beginning sector from which to begin reading the data.

In some embodiments, in response to determining that a third sector at a current read pointer location is a defective sector or indicates invalid data, the system: drops data corresponding to the third sector; marks the third sector as defective or invalid; and moves the current write pointer location to a next sequentially available sector of the identified track. In response to determining that the third sector indicates invalid data, the system packs any valid data for subsequent copying in response to an initiation of a data recycling procedure.

In some embodiments, distributing the plurality of spare sector pools among the plurality of concentric tracks causes the storage device to access a respective spare sector pool corresponding to the selected track based on the access-frequency information.

In some embodiments, in response to an initiation of a data recycling procedure, the system: identifies a valid sector with valid data which has been marked for subsequent copying; and copies the valid data from the valid sector to the current write pointer location.

BRIEF DESCRIPTION OF THE FIGURES

In the figures, like reference numerals refer to the same figure elements.

DETAILED DESCRIPTION

Figure 1:
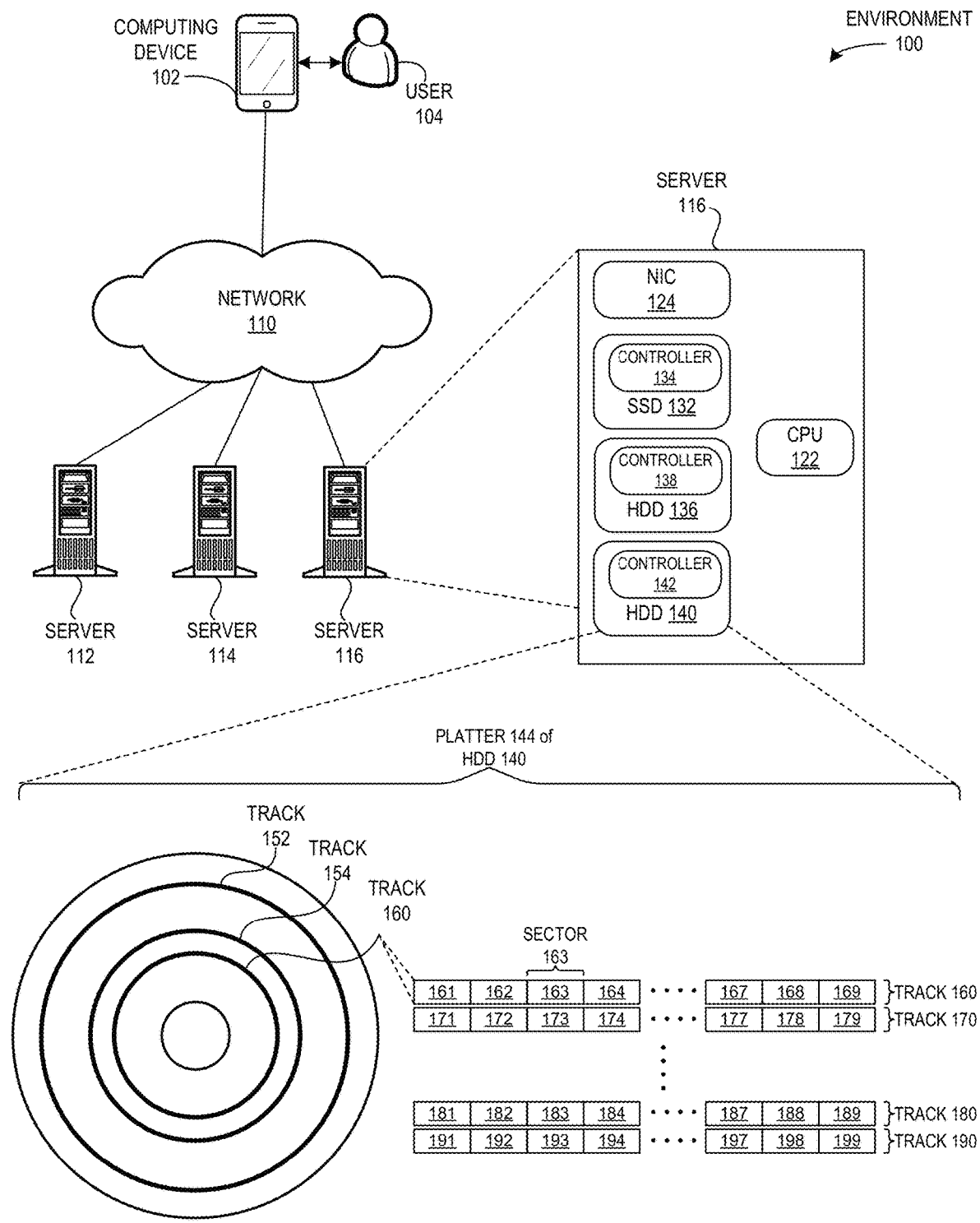
FIG. 1 illustrates an exemplary environment that facilitates data placement in a storage device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of improving the efficiency of a storage system by placing data on different physical regions (e.g., certain tracks) based on how frequently the data is accessed.

In the current economy, HDDs are significantly less expensive than SSDs. The capacity of HDDs continues to increase, which results in a reduced cost in the storage capacity per unit (e.g., $/GB). However, due to limitations on the mechanisms of HDDs, the input/output operations per second (IOPS) of an HDD has not increased along with the capacity. This has resulted in a reduced performance per unit (e.g., IOPS/GB).

Current solutions include a shingled magnetic recording (SMR) drive, heat-assisted magnetic recording (HAMR) devices, and microwave-assisted magnetic recording (MAMR) devices. However, while these devices may provide an increased areal density for storage, and thus result in a reduced storage capacity cost (in $/GB), the overall TOPS in these devices has not correspondingly increased. Not only do these current solutions involve a reduced performance per unit (in IOPS/GB), but an application may only be able to use part of the entire capacity of an HDD. That is, an application cannot utilize the entirety of the increased storage capacity of the HDD. This can decrease the efficiency of the HDD as well as the overall efficiency and performance of the storage system.

The embodiments described herein improve the efficiency and performance of a storage system by placing data on different tracks of an HDD based on the access frequency or "hotness" of the data. An HDD can include multiple platters; a platter can include multiple tracks (e.g., a plurality of concentric physical rings); and a track can include multiple sectors, where a sector is the small unit of physical storage on the disk (e.g., 512 B). Each side of a platter includes only one read/write head. The "seek time" refers to the time it takes to move a head from one track to a destination track. The "rotation time" refers to the time it takes for the head to move to the desired location (i.e., sector) on the destination track. The "transfer time" refers to the time it takes to read the data from or write the data to the desired location on the destination track. The "access latency" refers to the time it takes to access the desired data in the HDD. The access latency depends on the rotation speed, e.g., the angular velocity or the rounds per minute (RPM). Generally, the access latency includes the seek time, the rotation time, and the transfer time. The transfer time can typically be pipelined and, unlike the seek time and the rotation time, may not significantly affect the TOPS.

The angular velocity of the platter is based on the RPM. The tracks located closer to the outer rings of the platter ("outer tracks") have a larger diameter than the tracks located closer to the inner rings ("inner tracks"). The outer tracks can also access more sectors than the inner tracks, and can deliver a higher TOPS. In the embodiments described herein, the system maps the outer tracks to data from applications which require the highest TOPS, and gradually maps the tracks to different applications based on varying TOPS requirements. Data with the highest access-frequency is written to the outer tracks, while data with the lowest access-frequency is written to the inner tracks, as described below in relation to FIG. 2B.

By placing the data in different physical regions of the platter based on the access-frequency, the system can avoid the mixed usage of the tracks, which results in a lowered average TOPS for the entire HDD. In addition to the enhancement in the rotation efficiency, the system can also reduce the seek time because it may avoid moving the head a large distance for each application. Furthermore, the system can scatter or distribute a plurality of spare sector pools among the different physical regions or tracks (i.e., based on the "hotness" or access-frequency of data in a respective physical region). This can result in reducing the average TOPS by reducing the amount of time consumed by the HDD in seeking a spare sector pool. The distribution of the spare sector pools is described below in relation to FIG. 3B.

Thus, the embodiments described herein provide a system which improves the efficiency of a storage system, where the improvements are fundamentally technological. The improved efficiency can include an improved performance in latency for completion of an I/O operation. The system provides a technological solution (i.e., a storage system which facilitates placing data on different physical regions/tracks based on how frequently the data is accessed) to the technological problem of reducing latency in an I/O operation in a storage device, which improves both the Quality of Service (QoS) and the overall efficiency of the system.

Exemplary Environment for Facilitating Placing Data in Different Physical Regions Based on Access Frequency FIG. 1 illustrates an exemplary environment 100 that facilitates data placement in a storage device, in accordance with an embodiment of the present application. Computing device 102 can include, for example, a tablet, a mobile phone, an electronic reader, a laptop computer, a desktop computer, or any other computing device. Computing device 102 can communicate via a network 110 with servers 112, 114, and 116, which can be part of a distributed storage system. Servers 112-116 can include a storage server, which can include a CPU, an interface card, and storage devices or modules. For example, server 116 can include; a CPU 122; a network interface card (NIC) 124; a solid state drive (SSD) 132 with a controller 134; and hard disk drives (HDDs) 136 and 140, each with a controller 138 and 142, respectively. An HDD can include non-volatile memory, which can consist of multiple platters. A platter can have multiple tracks or concentric rings, and a track can have multiple sectors. Data can be stored in sectors on the tracks of the platters, and can be access via a head which is attached on an arm, as described below in relation to FIG. 2A.

For example, HDD 140 can have a platter 144, which includes multiple tracks, including tracks 152, 154, and 160. Track 160 can include multiple sectors e.g., sectors 161-164 and 167-169. Similarly: a track 170 can include sectors 171-174 and 177-179; a track 180 can include sectors 181-184 and 187-189; and a track 190 can include sectors 191-194 and 197-199. Data can be written sequentially to an HDD track in a particular "zone" based on an access-frequency, as described below in relation to FIG. 2B.

Exemplary Embodiment of Data Placement Based on Physical Zones or Regions

Figure 2B:
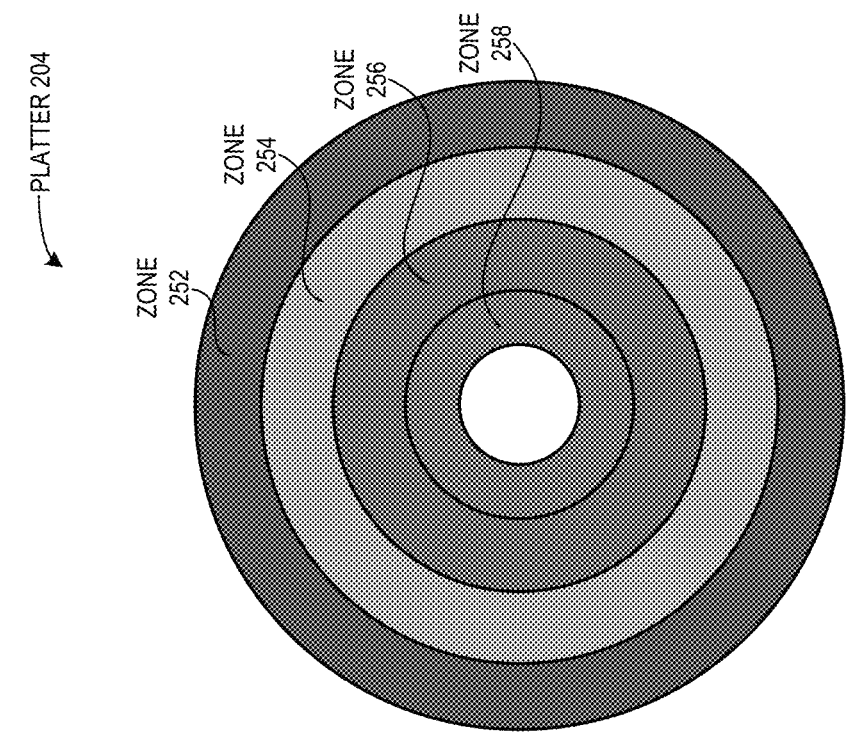
FIG. 2B illustrates an exemplary platter for facilitating data placement in a storage device, including physical regions or zones based on access-frequency, in accordance with an embodiment of the present application.
Figure 2A:
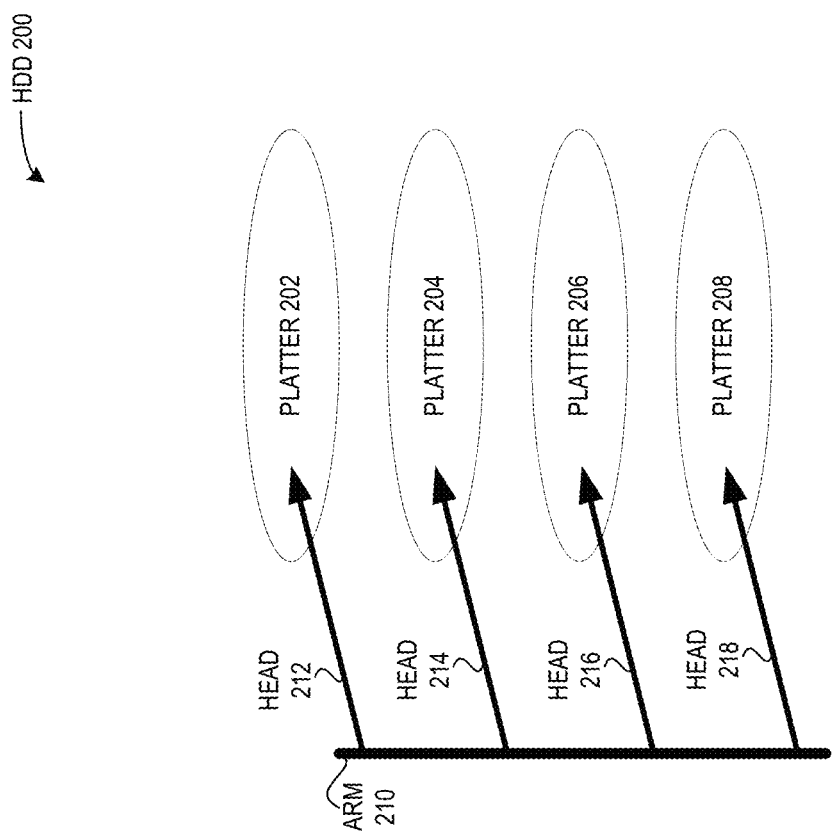
FIG. 2A illustrates an exemplary storage device with multiple platters and one head per platter, in accordance with the prior art.

FIG. 2A illustrates an exemplary storage device (HDD 200) with multiple platters and one head per platter, in accordance with the prior art. HDD 200 can include: a platter 202 with a corresponding read/write head 212; a platter 204 with a corresponding read/write head 214; a platter 206 with a corresponding read/write head 216; and a platter 208 with a corresponding read/write head 218. Heads 212-218 may be located on a physical arm 210. HDD 200 can also include tracks on both sides of each platter, with one head for each platter side (not shown).

FIG. 2B illustrates an exemplary platter 204 for facilitating data placement in a storage device, including physical regions or zones based on access-frequency, in accordance with an embodiment of the present application. Platter 204 can include physical zones 252, 254, 256, and 258. Each zone can include a plurality of tracks.

During operation, data may be "placed" (e.g., stored or written) to a particular pre-defined zone of the platter based on the access-frequency of the data. Recall that the access latency of data depends on the rotation speed, e.g., the angular velocity or the rounds per minute (RPM). Generally, the access latency includes the seek time, the rotation time, and the transfer time. The angular velocity of the platter is based on the RPM. The tracks located closer to the outer rings of the platter ("outer tracks") have a larger diameter than the tracks located closer to the inner rings ("inner tracks"). Thus, the outer tracks can also access more sectors than the inner tracks, and can deliver a higher TOPS.

Data with the highest access-frequency is written to the outer tracks, while data with the lowest access-frequency is written to the inner tracks. For example, in platter 204, the outermost tracks are indicated by the red "hot" color of zone 252, with the innermost tracks are indicated by the blue "cool" color of zone 258. Thus, physical zones 252-258 indicate where data is to be placed based on the frequency of access (e.g., the "hotness" of the data, ranging from red, orange, green, and blue for most frequently accessed to least frequently accessed). Data which has a high access-frequency may be placed on the outer tracks (e.g., a track of zone 252), while data with a low access-frequency may be placed on the inner tracks (e.g., a track of zone 258).

By placing the data in different physical regions of the platter based on the access-frequency, the system can avoid the mixed usage of the tracks, which results in a lowered average TOPS for the entire HDD. In addition to the enhancement in the rotation efficiency, the system can also reduce the seek time because it may avoid moving the head a large distance for each application.

Exemplary Distributed Spare Sector Pools

Figure 3B:
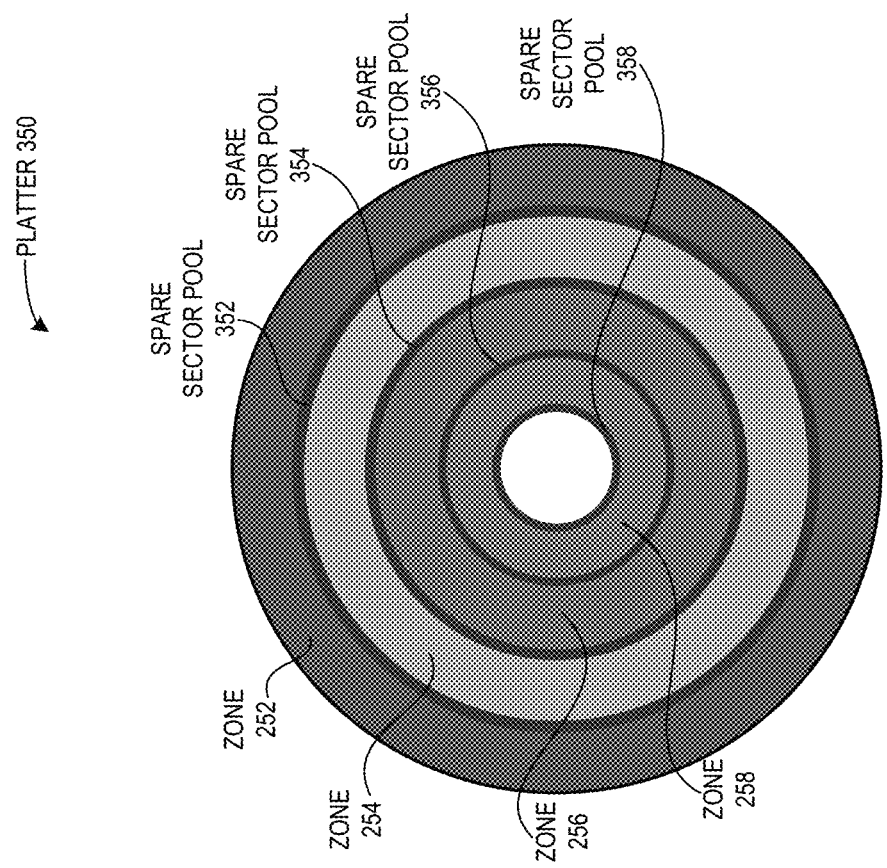
FIG. 3B illustrates an exemplary platter with distributed spare sector pools, in accordance with an embodiment of the present application.
Figure 3A:
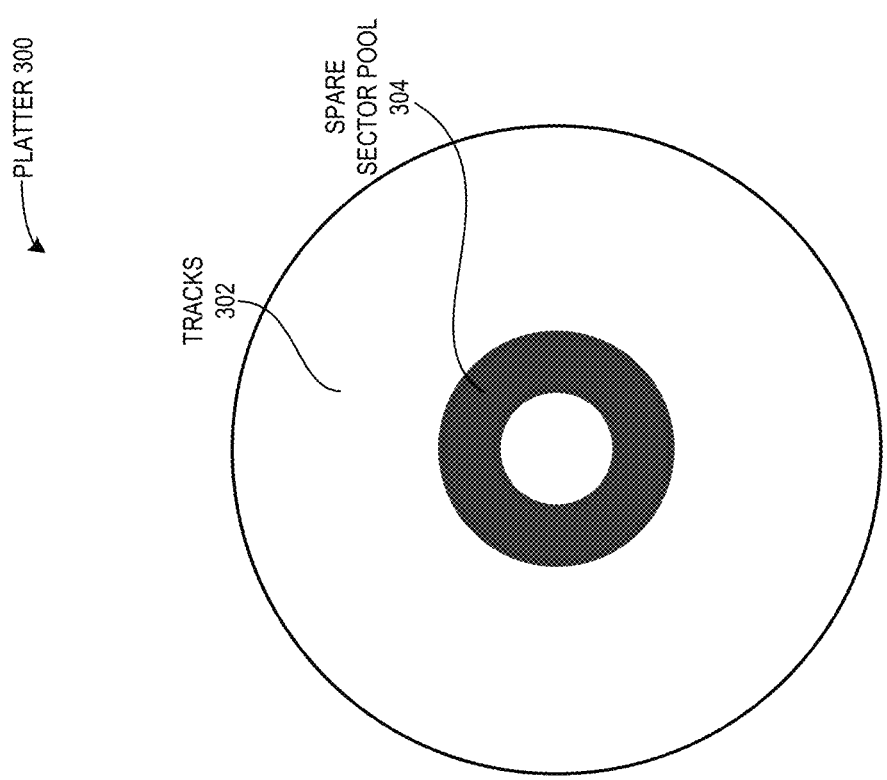
FIG. 3A illustrates an exemplary platter with a single spare sector pool, in accordance with the prior art.

FIG. 3A illustrates an exemplary platter 300 with a single spare sector pool 304, in accordance with the prior art. In conventional platter 300, spare sector pool 304 is located at the inner tracks. Thus, while processing data in an outer track, if a pending or defective sector is encountered, the read head must move to an inner track to obtain a spare sector. This may increase the seek time because the new sector is not contiguous with or near to the pending or defective original sector or tracks. Furthermore, the inner track has a lower linear velocity than the outer track. These two factors may result in a lowered or reduced TOPS.

Embodiments of the present application address the lowered TOPS from the single spare sector pool located in the inner tracks by distributing the spare sector pools in conjunction with the physical "hotness" or access-frequency based zones. FIG. 3B illustrates an exemplary platter 350 with distributed spare sector pools, in accordance with an embodiment of the present application.

Platter 350 can include several zones 252-258, indicated by a "hotness" color, similar to platter 204 of FIG. 2B. Platter 350 can also include a set of distributed spare sector pools. A spare sector pool can include one or more tracks, and can work or be associated with a corresponding physical zone. For example, zone 252 can correspond to a spare sector pool 352. During operation, while processing data in a track of zone 252, if the system encounters a pending or defective sector, the system can move the head to spare sector pool 352. This can result in a reduced seek time, and, consequently, a reduced TOPS, because spare sector pool 352 is located closer than spare sector pool 304 (i.e., inner tracks of conventional spare sector pool placement) to the tracks of zone 252. Furthermore, the linear velocity of the tracks in spare sector pool 352 is faster than the linear velocity of the tracks in spare sector pool 304, which can also result in a reduced TOPS. Similarly: zone 254 can correspond to a spare sector pool 354; zone 256 can correspond to a spare sector pool 356; and zone 258 can correspond to a spare sector pool 358.

Thus, by using multiple spare sector pools instead of a single spare sector pool and by distributing the multiple spare sector pools among the concentric tracks of the platter (as in the platter of FIG. 3B), the embodiments described herein enhance the performance of a storage device by reducing the seek time, which results in reducing the TOPS. This enhancement can improve the efficiency of a storage device and, consequently, the overall efficiency of a distributed storage system which includes such a storage device.

Updating Data and Replacing a Pending or Defective Sector

Figure 4A:
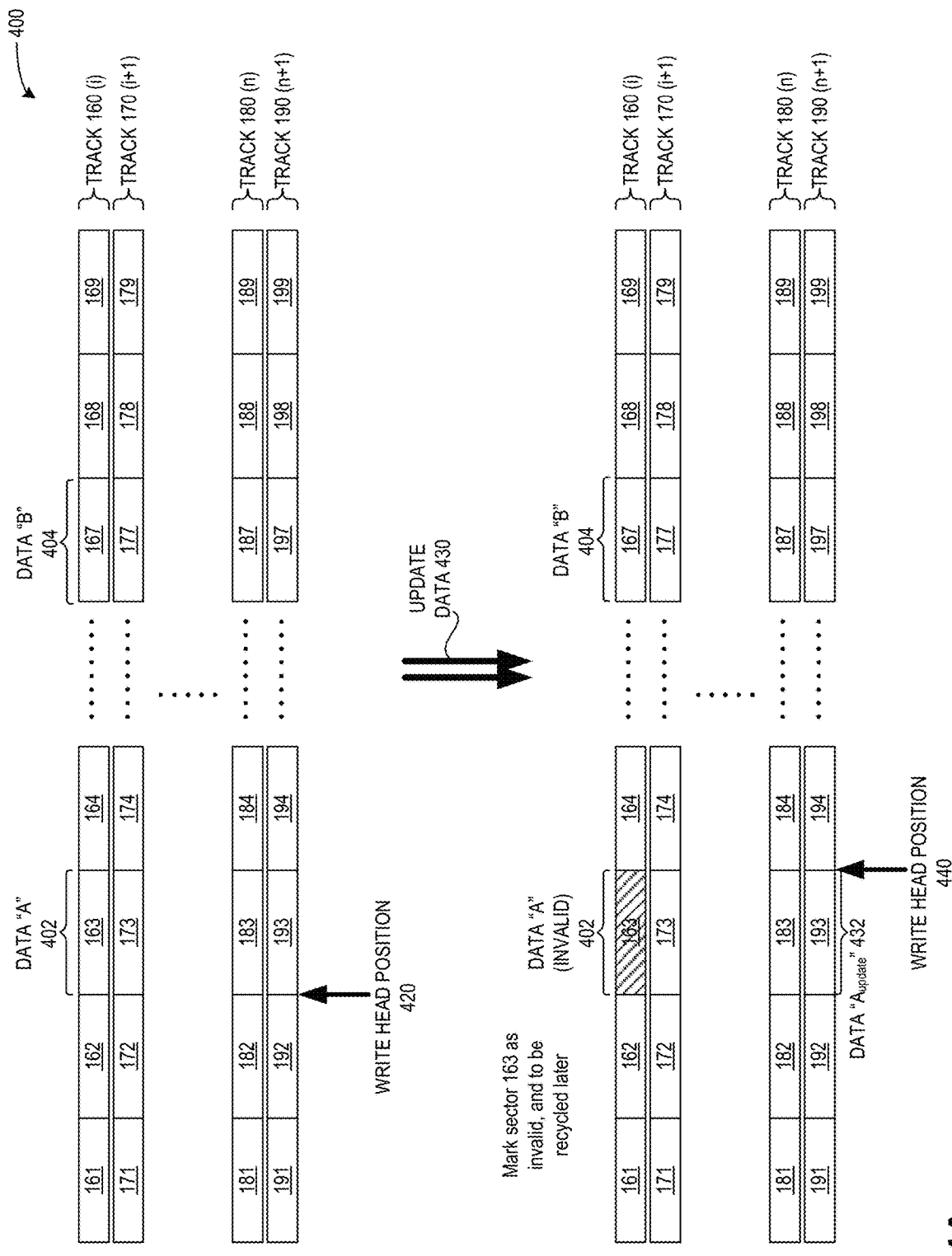
FIG. 4A presents an exemplary environment for updating data, in accordance with an embodiment of the present application.

FIG. 4A presents an exemplary environment 400 for updating data, in accordance with an embodiment of the present application. Environment 400 depicts several tracks, including a track 160 (*i*), a track 170 (*i*+1), a track 180 (*n*), and a track 190 (*n*+1). Each track can include multiple sectors, similar to the tracks of platter 144 of HDD 140, as described above in relation to FIG. 1. Track 160 can include sectors 161-164 and 167-169; track 170 can include sectors 171-174 and 177-179; track 180 can include sectors 181-184 and 187-189; and track 190 can include sectors 191-194 and 197-199. Sector 163 can include data "A" 402, and sector 167 can include data "B" 404. A write head position 420 may be currently located at the end of sector 192 and at the beginning of sector 193.

During operation, the system may receive data to be written to the storage device, wherein the received data is an update (e.g., data "$A_{update}$") to existing data (e.g., data "A"). Instead of moving the write head from the beginning of sector 193 to the beginning of sector 163 to perform an in-place overwrite or update, the system can instead perform a sequential write at the current or immediate location of the write pointer location, e.g., at write head position 420. The system can perform an update data 430 function by appending the updated data at the current write pointer location of the particular track. That is, the system can mark sector 163 as invalid and to be recycled at a later time (e.g., as indicated by the diagonally left-slanted shading), write data "$A_{update}$" 432 to sector 193, and move the write head to a write head position 440.

Figure 4B:
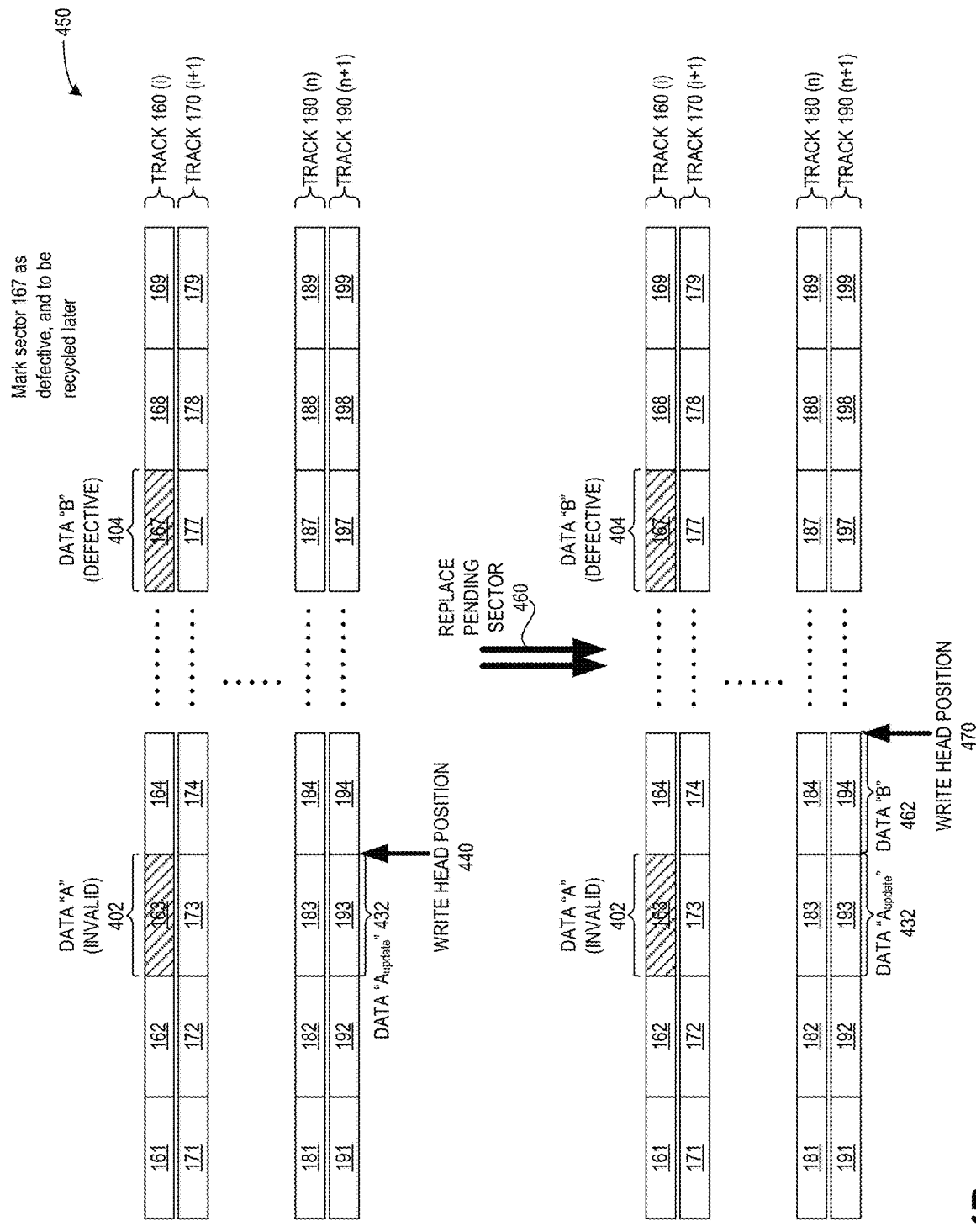
FIG. 4B presents an exemplary environment for replacing a pending or defective sector, in accordance with an embodiment of the present application.

FIG. 4B presents an exemplary environment 450 for replacing a pending or defective sector, in accordance with an embodiment of the present application. Environment 450 is a snapshot beginning from after the system has performed the update data 430 function. A write head position 440 may be currently located at the end of sector 193 and at the beginning of sector 194. During operation, while processing data on track 160 (e.g., reading or writing data), the system can determine that sector 167, which contains data "B," is defective. The system can perform a replace pending sector 460 function by writing the data at the current or immediate location of the write pointer location, i.e., at write head position 440 to sector 194. Because the data from the pending sector (e.g., sector 167, which was previously marked as defective) is written to the current write head position, the system does not need to move the write head from the beginning of sector 194 to an inner diameter spare sector pool. Instead, the system can immediately write the data from the pending sector to the current position of the write pointer, thereby reducing the seek time and reducing the overall IOPS. Note that in some embodiments, the system can move the write head position to the distributed spare sector pool which corresponds to the track (e.g., track 160) on which the defective sector resides. Subsequently, the system can move the write head to a write head position 470 which is located at the end of sector 194.

Exemplary Environment for Recycling Data

In the embodiments described herein, data recycling may occur when there are no current incoming I/O requests from a host, but is also not restricted to this limitation. That is, the system can perform data recycling and processing of a current incoming I/O request at the same time. In the data recycling procedure, the system can move from one physical region to another physical region, and within a specific region, perform the recycling procedure track by track. The system can copy out valid sectors from a track, and drop invalid or defective sectors. When the data has been successfully copied from the "old sector," e.g., to another track at a current write position location, the old sector becomes immediately or directly available for writing. The system does not require an erase operation prior to writing new data to the old sector. In contrast with an SSD, the HDD data recycling procedure of the embodiments described herein does not require a minimal number of reserved blocks, an erase lock, etc.

Figure 5:
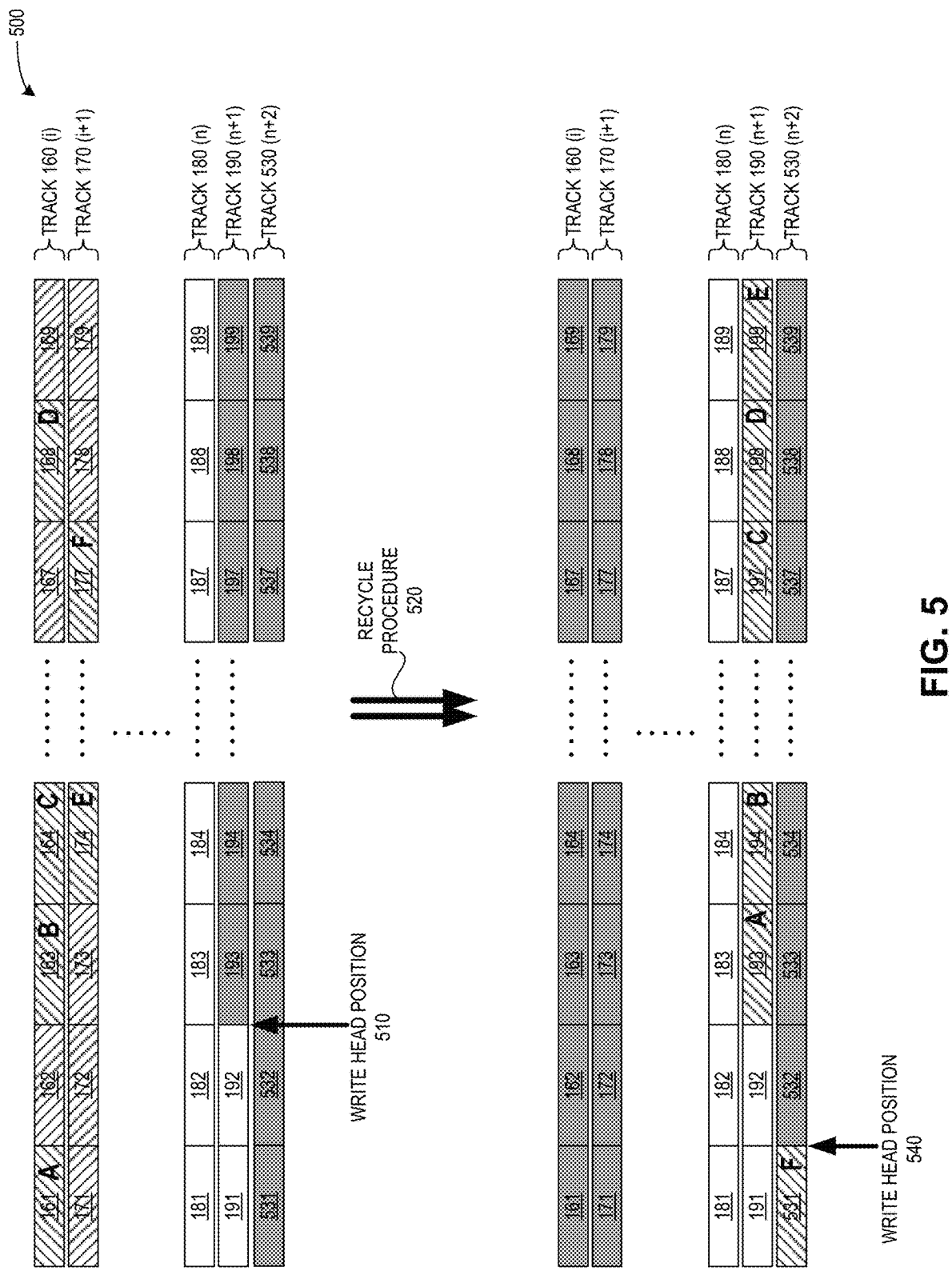
FIG. 5 presents an exemplary environment for recycling data, in accordance with an embodiment of the present application.

FIG. 5 presents an exemplary environment 500 for recycling data, in accordance with an embodiment of the present application. Environment 500 includes multiple tracks, including a track 160 (*i*), a track 170 (*i*+1), a track 180 (*n*), and a track 190 (*n*+1). Each track can include multiple sectors, similar to the tracks of platter 144 of HDD 140, as described above in relation to FIG. 1. Track 160 can include sectors 161-164 and 167-169; track 170 can include sectors 171-174 and 177-179; track 180 can include sectors 181-184 and 187-189; track 190 can include sectors 191-194 and 197-199; and track 530 can include sectors 531-534 and 537-599. In tracks 160 and 170, invalid data is indicated by a diagonally left-slanted shading (e.g., sectors 162, 167, 169, 171, 172, 173, 178, and 179), and valid data is indicated by the diagonally right-slanted shading (e.g., sectors 161, 163, 164, 168, 174, and 177). Data is marked in the valid sectors 161, 163, 164, 168, 174, and 177 as, respectively, data "A," "B," "C," "D," "E," and "F." Furthermore, sectors which are shaded in grey indicate sectors which are open or directly available for writing or storage or data placement. A write head position 510 may be currently located at the end of sector 192 and at the beginning of sector 193.

The system can perform a recycle procedure 520 by copying the valid data (A, B, C, D, E, and F) to open or available blocks at the next sequentially available sector based on the current write head position. For example, the system can write data A (e.g., valid data from old sector 161) to open sector 193. Similarly, the system can write data B to sector 194, data C to sector 197, data D to sector 198, data E to sector 199, and data F to sector 531, which results in the write head located at a current write head position 540.

Thus, when recycle procedure 520 has successfully completed, entire tracks are immediately or directly available for writing, e.g., tracks 160 and 170, as indicated by all sectors in the respective tracks shaded in grey.

Figure 6:
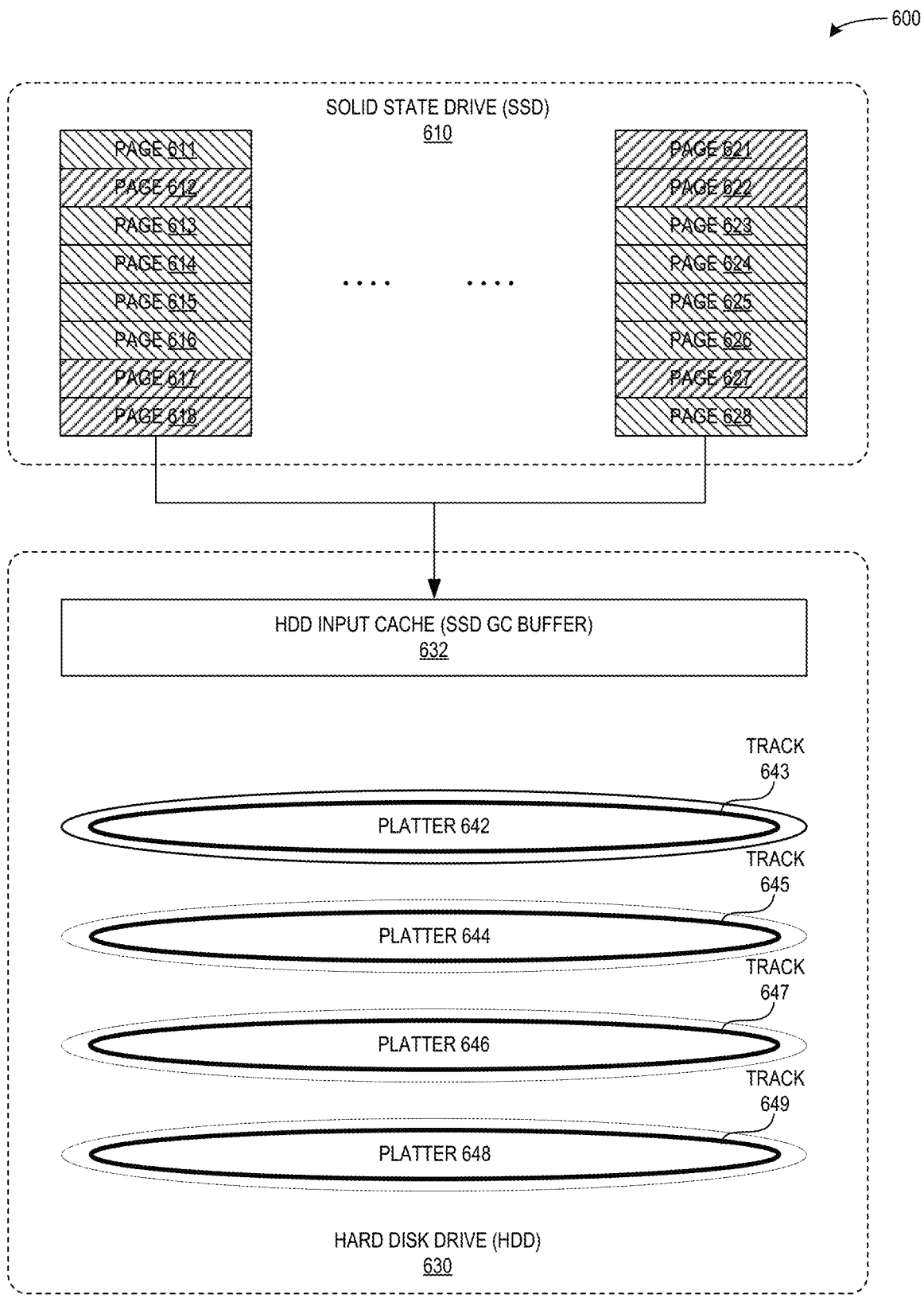
FIG. 6 presents an exemplary environment for sequentially writing data from an SSD to an HDD based on a track-wise operation, in accordance with an embodiment of the present application.

Exemplary Environment for Data Placement with SSD and HDD; and Exemplary Whole-Track Read FIG. 6 presents an exemplary environment 600 for sequentially writing data from an SSD to an HDD based on a track-wise operation, in accordance with an embodiment of the present application. Environment 600 indicates a storage tier with a solid state drive (SSD) 610 and a hard disk drive (HDD 630). SSD 610 can work as the cache for HDD 630. This relieves SSD 610 from the burden of having to perform internal garbage collection procedures. During operation, when SSD 610 detects a condition which triggers garbage collection, the system can read out the recycled NAND blocks, pack the valid data together, erase the data from the recycled NAND blocks, and write the packed valid data to HDD 630 in a track-wise sequential write, as described above in relation to FIG. 5 and below in relation to FIGS. 8A-8C.

For example, in SSD 610, invalid pages are indicated by a diagonally left-slanted shading (e.g., pages 611, 613, 614, 615, 616, 623, 624, 625, 626, and 628), and valid pages are indicated by the diagonally right-slanted shading (e.g., pages 612, 617, 618, 621, 622, and 627). When SSD 610 detects a condition which triggers an initiation of garbage collection, SSD 610 can read out the data from the valid pages, pack the data from the valid pages, and write the valid pages to an HDD input cache (SSD GC buffer) 632 residing on HDD 630. In response to receiving the valid data in cache 632, or in response to another predetermined condition, HDD 630 can subsequently store or place the packed data from input cache 632 onto a track in a particular zone of a platter, based on the "hotness" or access frequency of the data, as described above in relation to FIG. 2B. SSD 610 can mark or indicate the access-frequency of the packed valid data prior to transmitting the data to HDD 630. The mark or indication may be, e.g., a tag, a weighting, a number of times accessed for a given prior or current time period, metadata, header information, a flag, or other indicator associated with the data which indicates the frequency of access of the data (i.e., the hotness of the data).

Recall that HDD access latency includes the rotation time, which can comprise a significant percentage of the latency. Rotation time can include the time it takes to move the read head from a current read head location to the position at which data to be read begins. To reduce this time, the embodiments described herein provide a whole-track read, wherein regardless of the current read head location, the system can read the entire track starting from the current read head location, and obtain the correct data by performing a post-processing procedure on the data. The post-processing includes reshuffling or aligning the data into the desired format.

Figure 7:
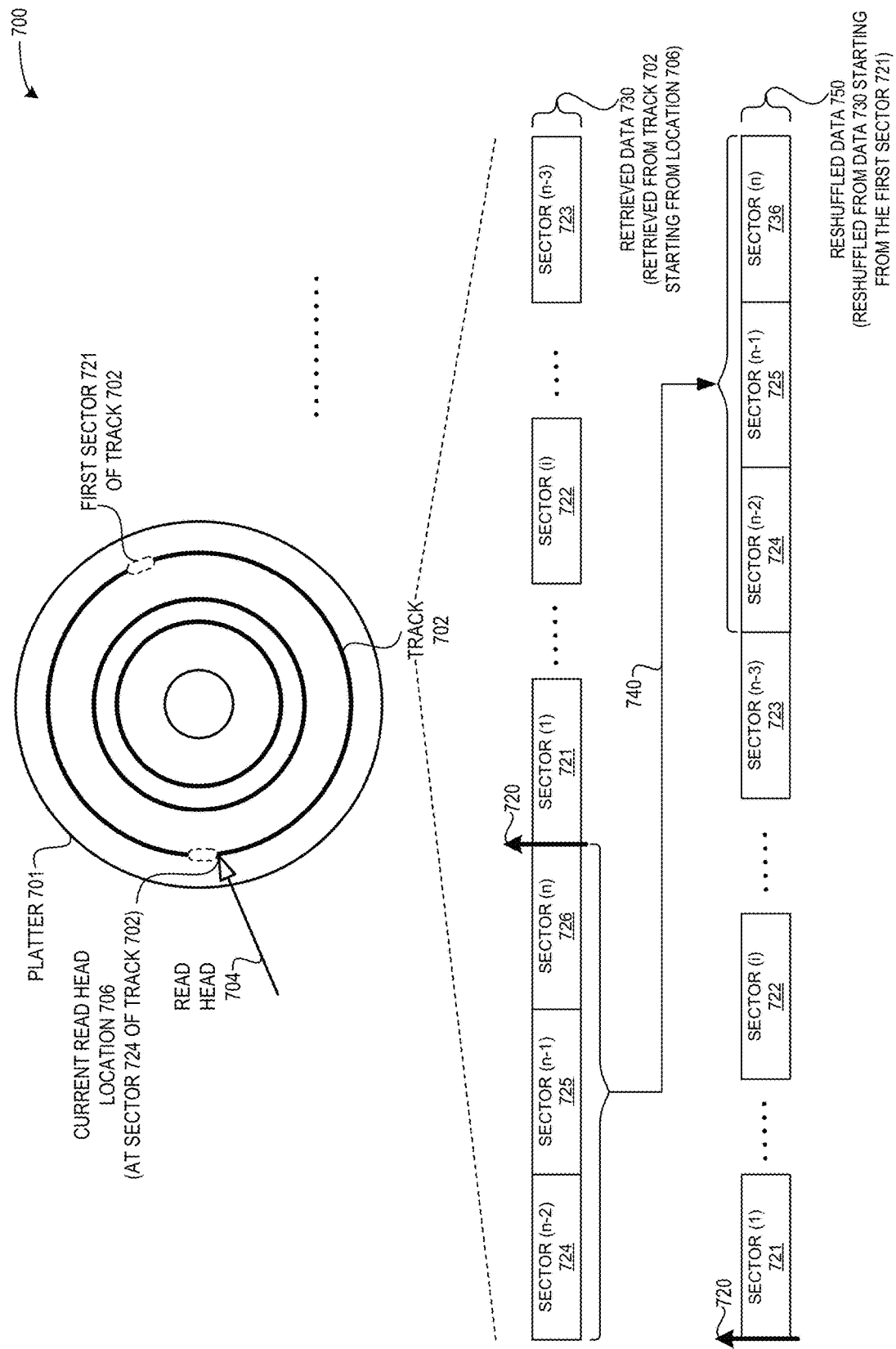
FIG. 7 presents an exemplary environment for performing a whole-track read and a subsequent reshuffle or alignment of data, in accordance with an embodiment of the present application.

FIG. 7 presents an exemplary environment 700 for performing a whole-track read and a subsequent reshuffle or alignment of data, in accordance with an embodiment of the present application. Environment 700 depicts a platter 701 with a read head 704 positioned at a current read head location 706 of a track 702. Current read head location 706 can be positioned at a sector 724 of track 702, while a first sector 721 of track 702 can be located almost a full half rotation away from current read head location 706. After ensuring that the system is on the correct track (i.e., track 702), the system can perform a whole-track read starting immediately from current read head location 706. That is, the system can obtain retrieved data 730 from track 702, starting from sector (n-2) 724. Retrieved data 730 is retrieved from track 702 starting from current read head location 706, and can include: sector (n-2) 724; sector (n-1) 725; sector (n) 726; sector (1) 721; . . . ; sector (i) 722; . . . ; and sector (n-3) 723. Retrieved data 730 can be stored in a data buffer. When the system reads sector (1) 721, the system can mark that first sector (with an indicator 720) in the data buffer. Subsequently, the system can reshuffle the retrieved data by reading the data starting from the marked first sector, i.e., sector (1) 721. Thus, reshuffled data 750 is data reshuffled from retrieved data 730 starting from the first sector 721, and includes: sector (1) 721; . . . ; sector (i) 722; . . . ; and sector (n-3) 723; sector (n-2) 724; sector (n-1) 725; and sector (n) 726. That is, the set of sectors initially retrieved from the immediate current read head location 706 (i.e., sectors 724-726) are reshuffled to be read at the end of the data (as indicated by a realignment 740).

Exemplary Method for Writing Data in a Storage Drive Based on Access-Frequency

Figure 8A:
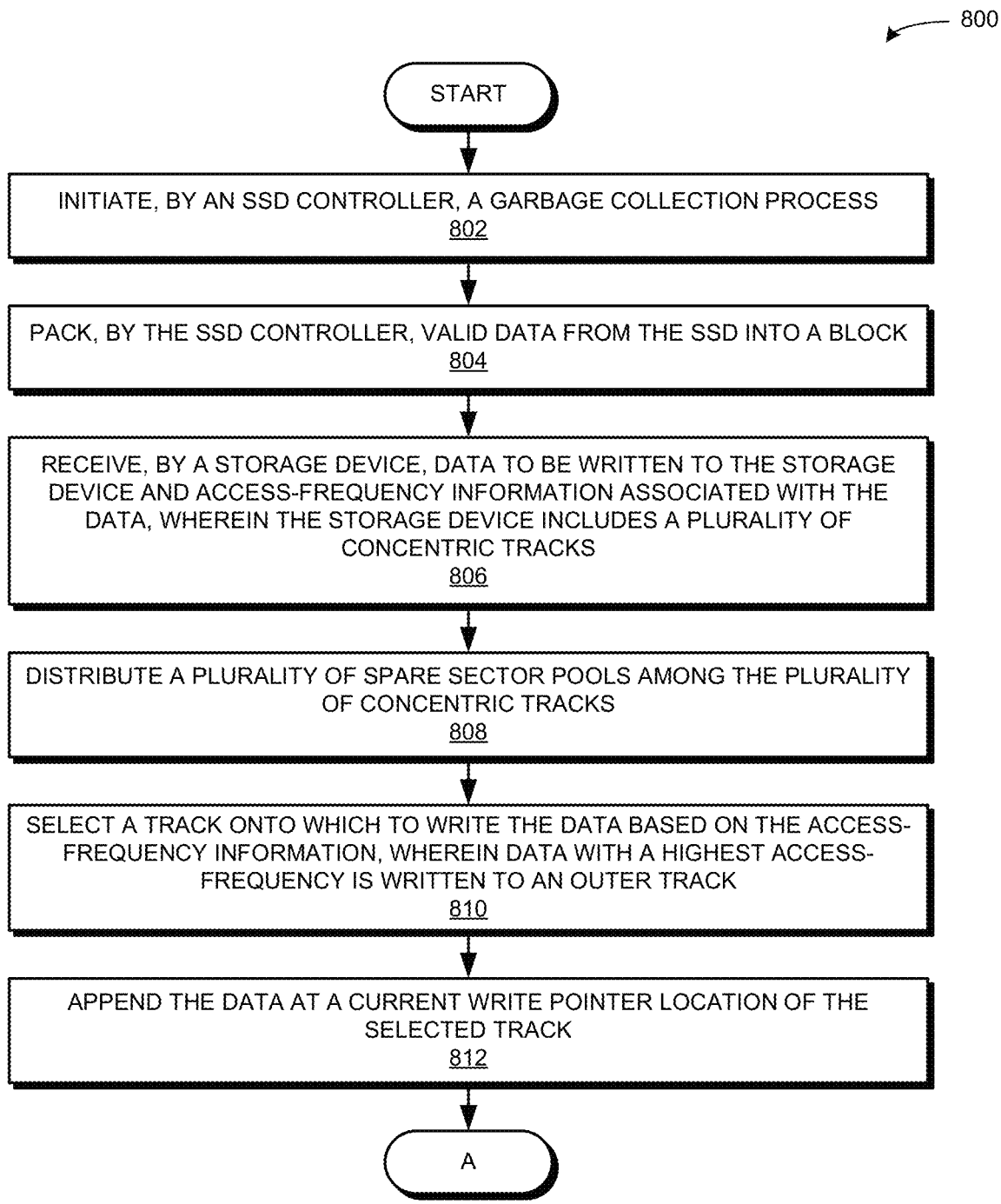
FIG. 8A presents a flowchart illustrating a method for writing data in a storage device based on access-frequency, in accordance with an embodiment of the present application.

FIG. 8A presents a flowchart 800 illustrating a method for writing data in a storage device based on access-frequency, in accordance with an embodiment of the present application. During operation, the system initiates, by an SSD controller, a garbage collection process (operation 802). The system packs, by the SSD controller, valid data from the SSD into a block (operation 804). The system receives, by a storage device, data to be written to the storage device and access-frequency information associated with the data, wherein the storage device includes a plurality of concentric tracks (operation 806). The system distributes a plurality of spare sector pools among the plurality of concentric tracks (operation 808), as described above in relation to FIG. 3B. The received data to be written can be stored in and obtained from an input cache or other data buffer in the storage device, such as an HDD. The SSD and the HDD can work together in a distributed storage system, as described above in relation to FIGS. 1 and 5.

The system selects a track onto which to write the data based on the access-frequency information, wherein data with a highest access-frequency is written to an outer track (operation 810). Data placement based on "hotness" or access-frequency is described above in relation to FIG. 2B. The system appends the data at a current write pointer location of the selected track (operation 812), and the operation continues as described at Label A of FIG. 8B.

Figure 8B:
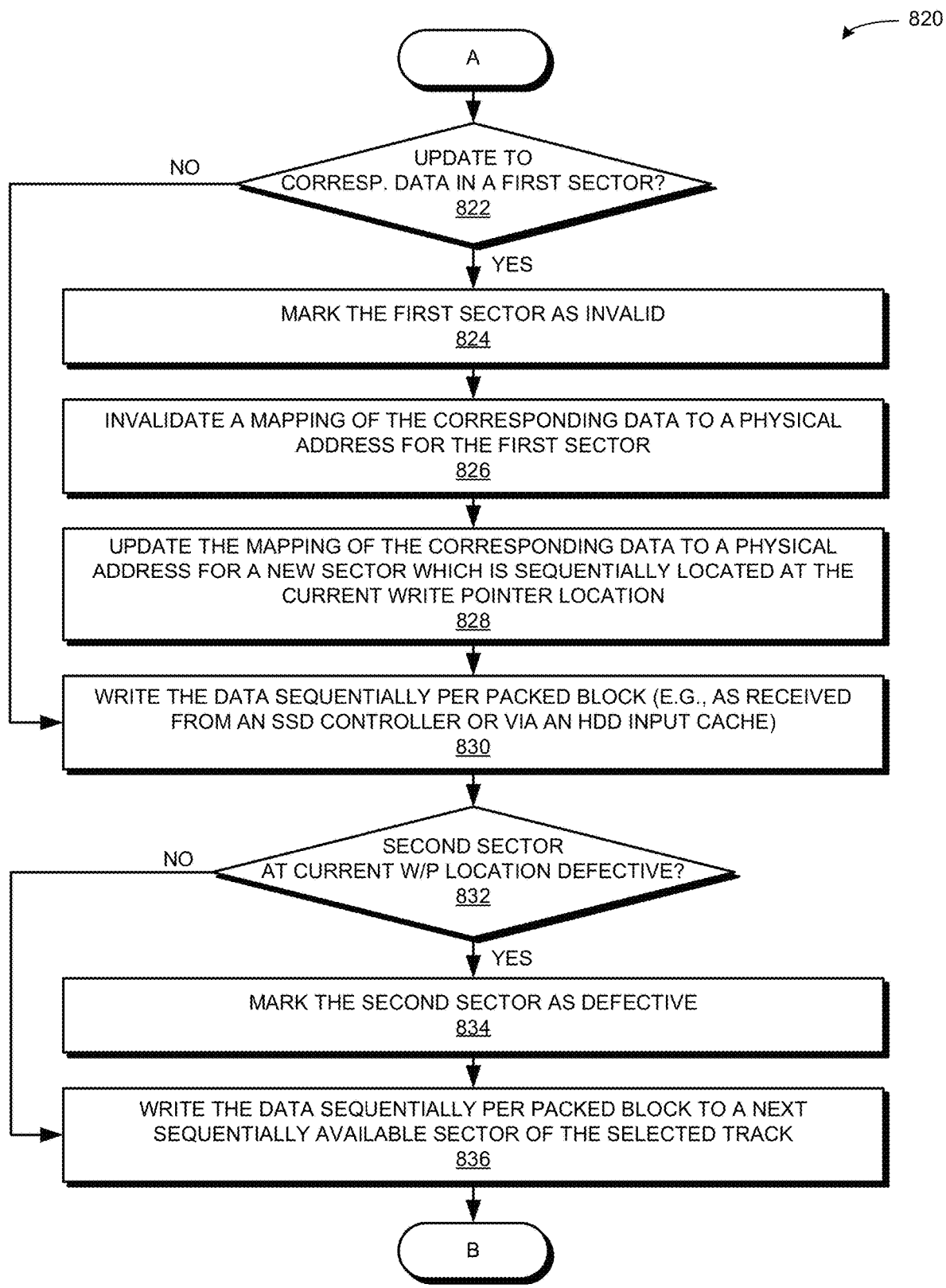
FIG. 8B presents a flowchart illustrating a method for writing data in a storage device based on access-frequency, including processing invalid data and a defective sector, in accordance with an embodiment of the present application.

FIG. 8B presents a flowchart 820 illustrating a method for writing data in a storage device based on access-frequency, including processing invalid data and a defective sector, in accordance with an embodiment of the present application. During operation, the system determines if the data to be written is an update to corresponding data in a first sector of the platter (decision 822). The first sector can be on the same or a different track of the platter, or in some embodiments, on a different platter of the storage device. If the system determines an update (decision 822), the system marks the first sector as invalid (operation 824). The system invalidates a mapping of the corresponding data to a physical address for the first sector (operation 826). The system updates the mapping of the corresponding data to a physical address for a new sector which is sequentially located at the current write pointer location (operation 828). The system writes the data sequentially per packed block (e.g., as received from the SSD controller or via an HDD input cache) (operation 830). If the system determines that the data to be written is not an update to existing data (decision 822), the operation continues as described at operation 830.

Subsequently, the system determines if a second sector at the current write pointer location is defective (decision 832). If the second sector is defective (decision 832), the system marks the second sector as defective (operation 834). The system can also update the mapping as needed to indicate the defective second sector. The system then writes the data sequentially per packed block to a next sequentially available sector of the selected track (operation 836), and the operation continues as described at Label B of FIG. 8C. If the second sector is not defective, the operation continues as described at operation 836.

Figure 8C:
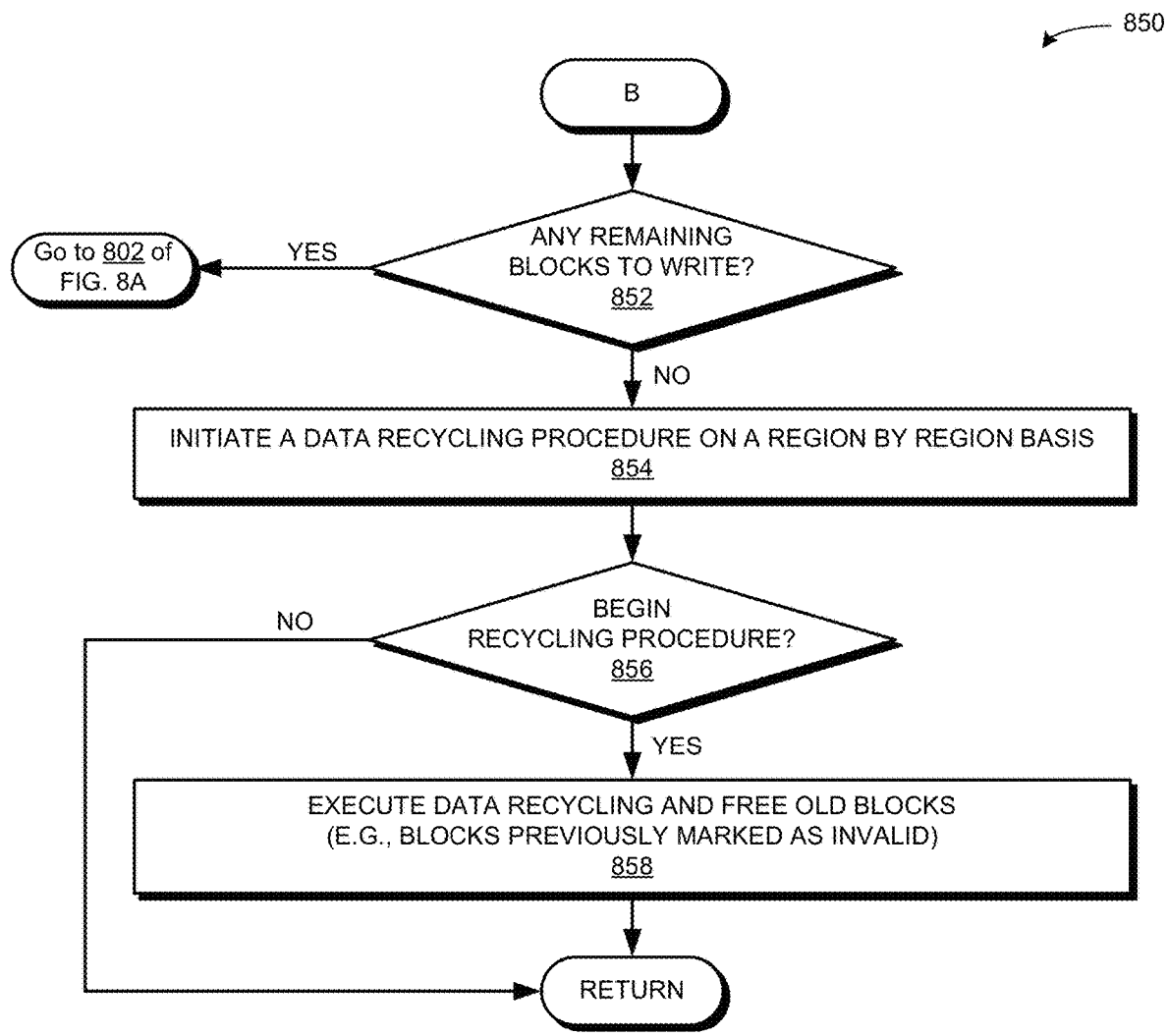
FIG. 8C presents a flowchart illustrating a method for writing data in a storage device based on access-frequency, including initiating a data recycling procedure, in accordance with an embodiment of the present application.

FIG. 8C presents a flowchart 850 illustrating a method for writing data in a storage device based on access-frequency, including initiating a data recycling procedure, in accordance with an embodiment of the present application. During operation, the system determines whether there are any remaining blocks to write (decision 852). If there are any remaining blocks to write (decision 852), the operation continues at operation 802 of FIG. 8A. If there are no remaining blocks to write (decision 852), the system initiates a data recycling procedure on a region by region basis (operation 854). Initiating a data recycling procedure can occur based on, e.g., a manual command triggered by a user or administrator of the system, a preconfigured system setting, or a detected predetermined condition.

The system determines whether to begin the recycling procedure (decision 856). If the system determines to begin the recycling procedure (decision 856), the system executes data recycling and frees old blocks (e.g., blocks which were previously marked at invalid) (operation 858). If the system determines not to begin the recycling procedure (decision 856), the operation returns.

Exemplary Method for Reading Data from a Storage Drive

Figure 9A:
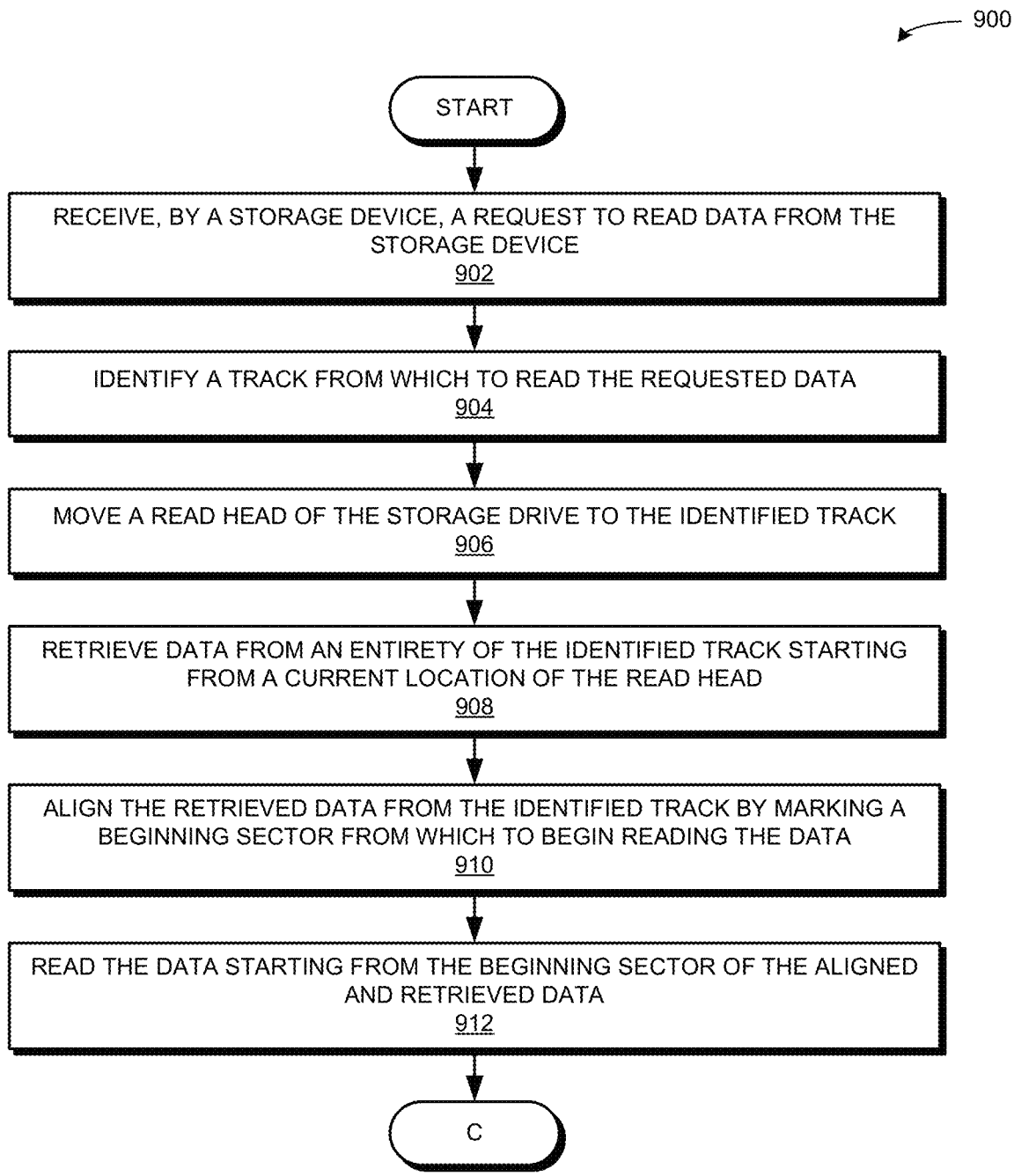
FIG. 9A presents a flowchart illustrating a method for reading data from a storage device, including reshuffling or aligning read data, in accordance with an embodiment of the present application.

FIG. 9A presents a flowchart 900 illustrating a method for reading data from a storage device, including reshuffling or aligning read data, in accordance with an embodiment of the present application. During operation, the system receives, by a storage device, a request to read data from the storage device (operation 902). The system identifies a track from which to read the requested data (operation 904). Data on the storage drive (e.g., on the platters and corresponding tracks of a platter) has been previously stored, written, or placed based on the "hotness" or access-frequency of the data, as described above in relation to FIG. 2B. The system moves a read head of the storage device to the identified track (operation 906). The system retrieves data from an entirety of the identified track starting from a current location of the read head (operation 908). The system can store the retrieved data in a data buffer. The system aligns the retrieved data from the identified track by marking a beginning sector from which to begin reading the data (operation 910). The aligning step can be a reshuffling of data sectors, as described above in relation to FIG. 7. The system reads the data starting from the (marked) beginning sector of the aligned and retrieved data (operation 912). The operation continues as described at Label C of FIG. 9A.

Figure 9B:
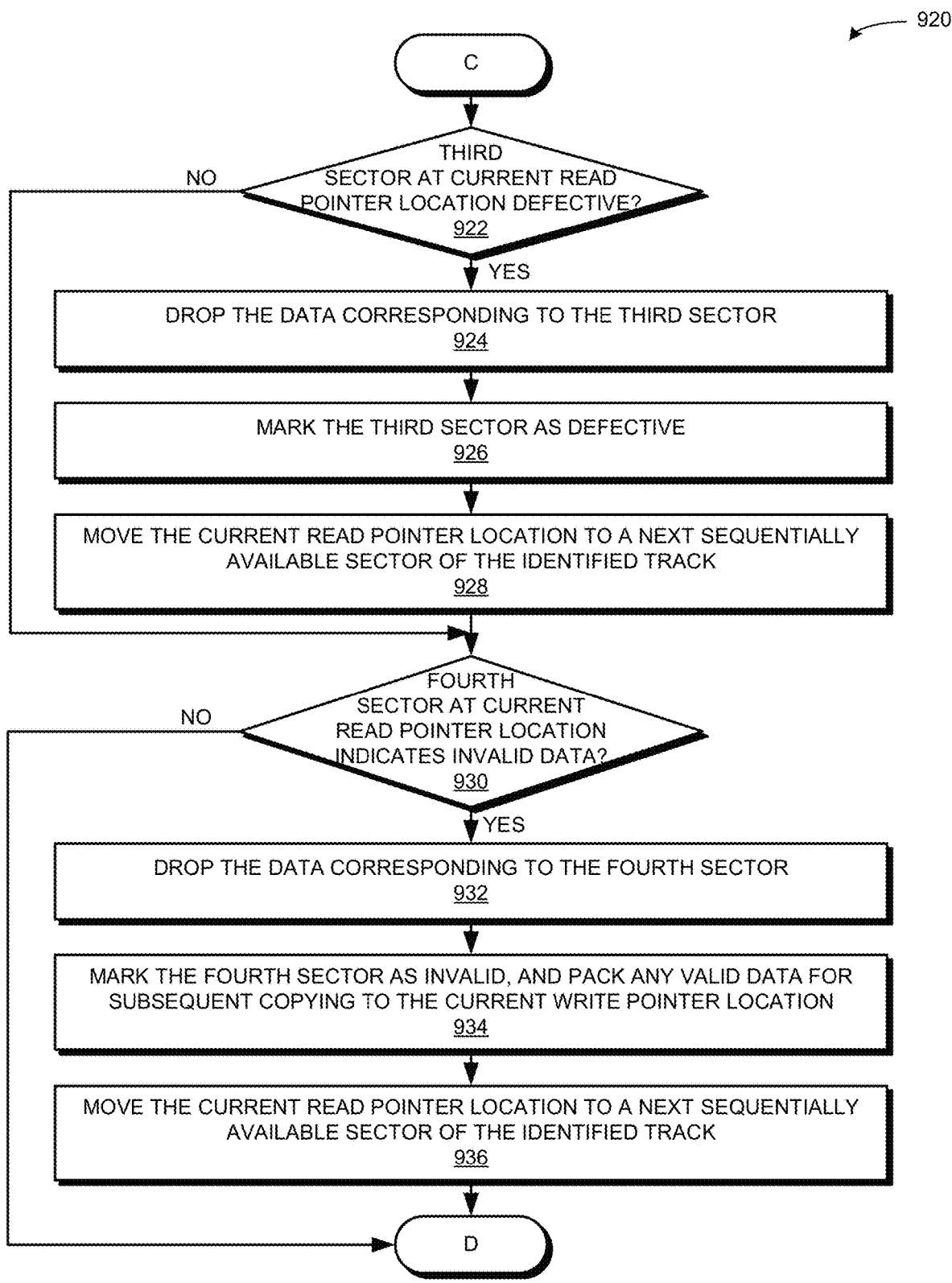
FIG. 9B presents a flowchart illustrating a method for reading data from a storage device, including processing a defective sector and invalid data, in accordance with an embodiment of the present application.

FIG. 9B presents a flowchart 920 illustrating a method for reading data from a storage device, including processing a defective sector and invalid data, in accordance with an embodiment of the present application. During operation, the system determines whether a third sector at the current read pointer location is defective (decision 922). If the system determines that the third sector is defective (decision 922), the system drops the data corresponding to the third sector (operation 924), marks the third sector as defective (operation 926), and moves the current read pointer location to a next sequentially available sector of the identified track (operation 928). If the system determines that the third sector is not defective (decision 922), the operation continues as described below at decision 930.

The system determines whether a fourth sector at the current read pointer location indicates invalid data (decision 930). If the system determines that the fourth sector indicates invalid data (decision 930), the system drops the data corresponding to the fourth sector (operation 932), marks the fourth sector as invalid, and packs any valid data for subsequent copying to the current write pointer location (operation 934). The system moves the current read pointer location to a next sequentially available sector of the identified track (operation 936), and the operation continues as described below at Label D of FIG. 9D. If the system determines that the fourth sector does not indicate invalid data (decision 930), the operation continues as described below at Label D.

Figure 9C:
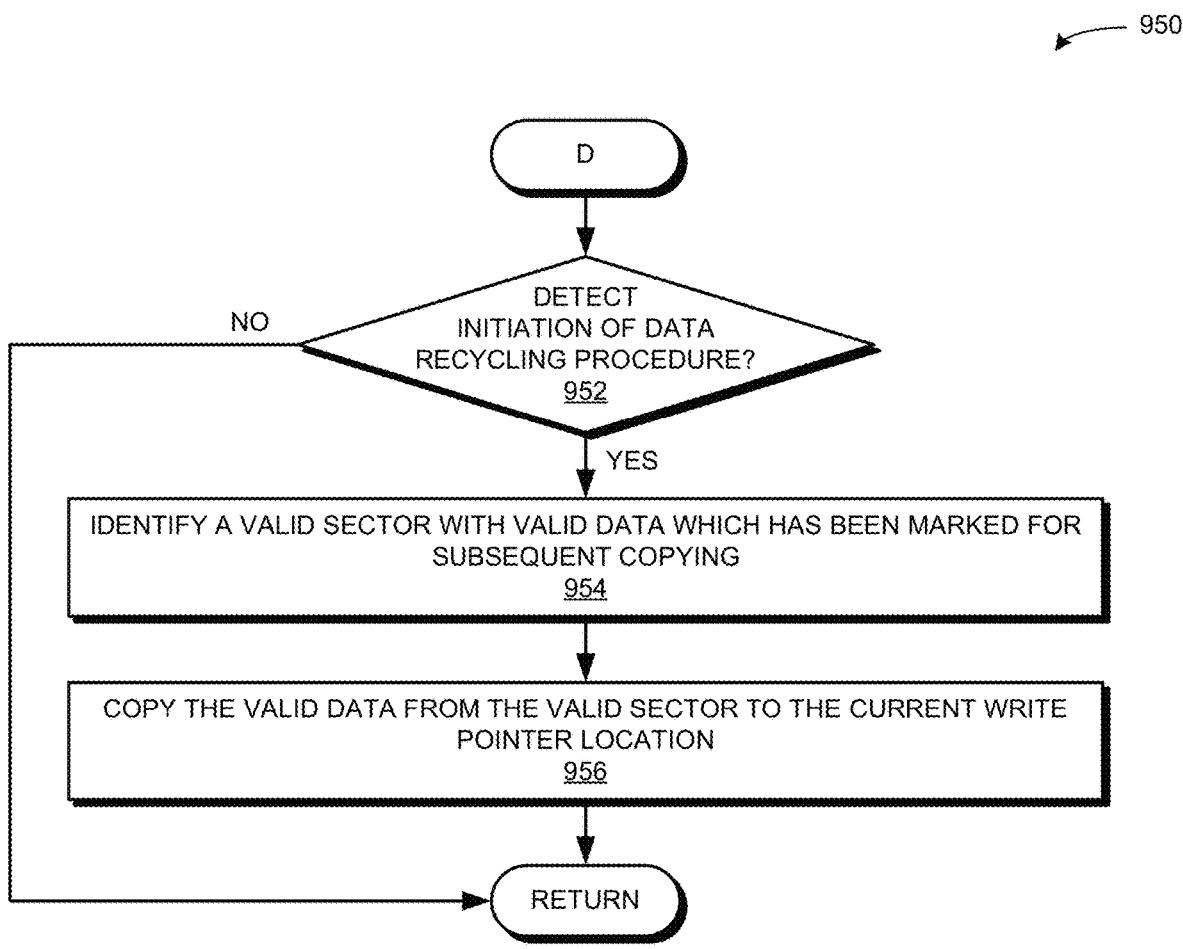
FIG. 9C presents a flowchart illustrating a method for reading data from a storage device, including a recycling procedure, in accordance with an embodiment of the present application.

FIG. 9C presents a flowchart 950 illustrating a method for reading data from a storage device, including a recycling procedure, in accordance with an embodiment of the present application. During operation, the system determines whether it detects an initiation of a data recycling procedure (decision 952). If it does not, the operation returns.

If the system does detect an initiation of a data recycling procedure (decision 952), the system identifies a valid sector with valid data which has been marked for subsequent copying (operation 954). The system copies the valid data from the valid sector to the current write pointer location (operation 956).

Exemplary Computer System and Apparatus

Figure 10:
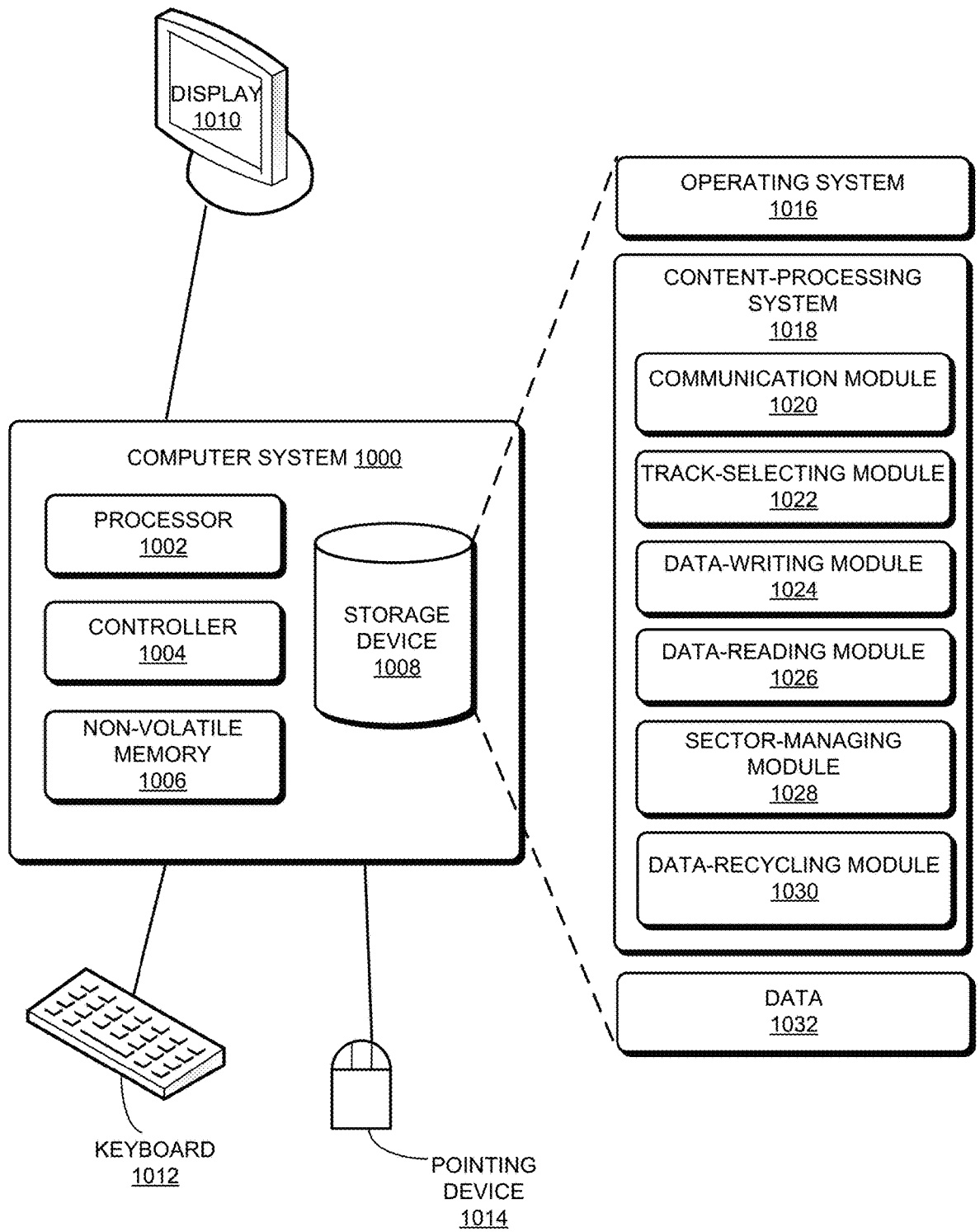
FIG. 10 illustrates an exemplary computer system that facilitates data placement in a storage device, in accordance with an embodiment of the present application.

FIG. 10 illustrates an exemplary computer system that facilitates data placement in a storage device, in accordance with an embodiment of the present application. Computer system 1000 includes a processor 1002, a controller 1004, a non-volatile memory 1006, and a storage device 1008. Computer system 1000 may also include volatile memory (not shown) which can include, e.g., RAM, that serves as a managed memory, and can be used to store one or more memory pools. Non-volatile memory 1006 can include persistent storage, e.g., a plurality of tracks, accessed via controller 1004. Furthermore, computer system 1000 can be coupled to a display device 1010, a keyboard 1012, and a pointing device 1014. Storage device 1008 can store an operating system 1016, a content-processing system 1018, and data 1032.

Content-processing system 1018 can include instructions, which when executed by computer system 1000, can cause computer system 1000 to perform methods and/or processes described in this disclosure. Specifically, content-processing system 1018 can include instructions for receiving and transmitting data packets, including a request to write or read data, and data to be processed and stored. Content-processing system 1018 can further include instructions for receiving, by a controller module of the device, a request to write or read data (communication module 1020).

Content-processing system 1018 can also include instructions for receiving, by a storage device, data to be written to the storage device and access-frequency information associated with the data, wherein the storage device includes a plurality of concentric tracks (communication module 1020). Content-processing system 1018 can include instructions for distributing a plurality of spare sector pools among the plurality of concentric tracks (sector-managing module 1028). Content-processing system 1018 can include instructions for selecting a track onto which to write the data based on the access-frequency information, wherein data with a highest access-frequency is written to an outer track (track-selecting module 1022). Content-processing system 1018 can further include instructions for appending the data at a current write pointer location of the selected track, thereby facilitating an enhanced data placement for subsequent access in the storage device (data-writing module 1024).

Content-processing system 1018 can additionally include instructions for processing data in a sector in response to determining an update to corresponding data to a sector (sector-managing module 1028), or in response to determining a defective sector (sector-managing module 1028). Content-processing system 1018 can include instructions for initiating a data recycling procedure (data-recycling module 1030). Content-processing system 1018 can include instructions for receiving and executing a request to read data from the storage device (data-reading module 1026).

Data 1032 can include any data that is required as input or that is generated as output by the methods and/or processes described in this disclosure. Specifically, data 1032 can store at least: a request to read or write data; data to be written, read, stored, or accessed; processed or stored data; a logical block address; a physical block address; new data; updated data; an indicator of a track on a platter, a zone on a platter, or a sector; a spare sector pool; an indicator of whether a sector is defective or has invalid data; an indicator of valid or invalid data; appended data; appended updated data; a predetermined condition for triggering a garbage collection procedure or a data recycling procedure; an indicator of a first sector on a track; an alignment or a reshuffling procedure; a data buffer; an input cache; a location of a read/write head; and a current location of a read/write pointer.

Figure 11:
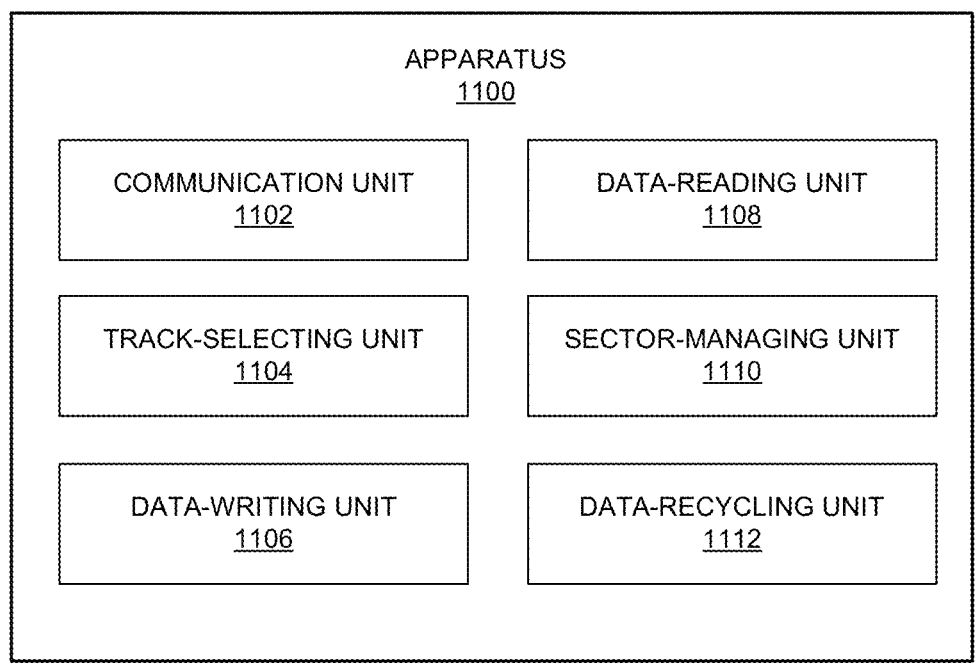
FIG. 11 illustrates an exemplary apparatus that facilitates data placement in a storage device, in accordance with an embodiment of the present application.

FIG. 11 illustrates an exemplary apparatus 1100 that facilitates data placement in a storage device, in accordance with an embodiment of the present application. Apparatus 1100 can comprise a plurality of units or apparatuses which may communicate with one another via a wired, wireless, quantum light, or electrical communication channel. Apparatus 1100 may be realized using one or more integrated circuits, and may include fewer or more units or apparatuses than those shown in FIG. 10. Further, apparatus 1100 may be integrated in a computer system, or realized as a separate device which is capable of communicating with other computer systems and/or devices. Specifically, apparatus 1100 can comprise units 1102-1112 which perform functions or operations similar to modules 1020-1030 of computer system 1000 of FIG. 10, including: a communication unit 1102; a track-selecting unit 1104; a data-writing unit 1106; a data-reading unit 1108; a sector-managing unit 1110; and a data-recycling unit 1112.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration an d description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data placement in a storage device, the method comprising:
receiving, by the storage device, data to be written to the storage device and access-frequency information associated with the data, wherein the storage device includes a plurality of concentric tracks;
distributing a plurality of spare sector pools for pending or defective sectors among the plurality of concentric tracks;
selecting a track onto which to write the data based on the access-frequency information, wherein data with a highest access-frequency is written to an outer track;
appending the data at a current write pointer location of the selected track;
in response to determining an update to corresponding data in a first sector of the selected track:
marking the first sector as invalid;
invalidating a mapping of the corresponding data to a physical address for the first sector; and
updating the mapping of the corresponding data to a physical address for a new sector which is sequentially located at the current write pointer location,
thereby facilitating an enhanced data placement for subsequent access in the storage device.

2. The method of claim 1, wherein in response to determining that a second sector at the current write pointer location is a defective sector, the method further comprises:
marking the second sector as defective;
writing the data to a next sequentially available sector of the selected track.

3. The method of claim 1, wherein in response to determining that the storage drive is not currently processing a request from a host, the method further comprises:
initiating a data recycling procedure; and
making available for storage tracks which include sectors marked as invalid, defective, or pending.

4. The method of claim 1, wherein the storage device is a hard disk drive, and wherein the method further comprises:
initiating, by a controller of a solid state drive coupled to the hard disk drive, a garbage collection process;
packing, by the controller of the solid state drive, valid data into a block; and
transmitting, by the controller of the solid state drive, the block of valid data, which is received by the storage device as the data to be written to the storage device.

5. The method of claim 1, further comprising:
receiving a request to read data from the storage device;
identifying a track from which to read the requested data;
moving a read head of the storage drive to the identified track;
retrieving data from an entirety of the identified track starting from a current location of the read head; and
reading the data starting from a beginning sector of the retrieved data.

6. The method of claim 5, further comprising:
aligning the retrieved data from the identified track by marking the beginning sector from which to begin reading the data.

7. The method of claim 5, wherein in response to determining that a third sector at a current read pointer location is a defective sector or indicates invalid data, the method further comprises:
dropping data corresponding to the third sector;
marking the third sector as defective or invalid; and
moving the current write pointer location to a next sequentially available sector of the identified track; and
wherein in response to determining that the third sector indicates invalid data, the method further comprises packing any valid data for subsequent copying in response to an initiation of a data recycling procedure.

8. The method of claim 1, wherein distributing the plurality of spare sector pools among the plurality of concentric tracks causes the storage device to access a respective spare sector pool corresponding to the selected track based on the access-frequency information.

9. The method of claim 1, wherein in response to an initiation of a data recycling procedure, the method further comprises:
identifying a valid sector with valid data which has been marked for subsequent copying; and
copying the valid data from the valid sector to the current write pointer location.

10. A computer system for facilitating data placement in a storage device, the system comprising:
a processor; and
a memory coupled to the processor and storing instructions, which when executed by the processor cause the processor to perform a method, wherein the computer system is a storage device, the method comprising:
receiving, by the storage device, data to be written to the storage device and access-frequency information associated with the data, wherein the storage device includes a plurality of concentric tracks;
distributing a plurality of spare sector pools for pending or defective sectors among the plurality of concentric tracks;
selecting a track onto which to write the data based on the access-frequency information, wherein data with a highest access-frequency is written to an outer track;
appending the data at a current write pointer location of the selected track;
in response to determining an update to corresponding data in a first sector of the selected track:
marking the first sector as invalid;
invalidating a mapping of the corresponding data to a physical address for the first sector; and
updating the mapping of the corresponding data to a physical address for a new sector which is sequentially located at the current write pointer location,
thereby facilitating an enhanced data placement for subsequent access in the storage device.

11. The computer system of claim 10, wherein in response to determining that a second sector at the current write pointer location is a defective sector, the method further comprises:
marking the second sector as defective;
writing the data to a next sequentially available sector of the selected track.

12. The computer system of claim 10, wherein in response to determining that the storage drive is not currently processing a request from a host, the method further comprises:
initiating a data recycling procedure; and
making available for storage tracks which include sectors marked as invalid, defective, or pending.

13. The computer system of claim 10, wherein the storage device is a hard disk drive, and wherein the method further comprises:
initiating, by a controller of a solid state drive coupled to the hard disk drive, a garbage collection process;
packing, by the controller of the solid state drive, valid data into a block; and
transmitting, by the controller of the solid state drive, the block of valid data, which is received by the storage device as the data to be written to the storage device.

14. The computer system of claim 10, wherein the method further comprises:
receiving a request to read data from the storage device;
identifying a track from which to read the requested data;
moving a read head of the storage drive to the identified track;
retrieving data from an entirety of the identified track starting from a current location of the read head; and
reading the data starting from a beginning sector of the retrieved data.

15. The computer system of claim 14, wherein the method further comprises:
aligning the retrieved data from the identified track by marking the beginning sector from which to begin reading the data.

16. The computer system of claim 14, wherein in response to determining that a third sector at a current read pointer location is a defective sector or indicates invalid data, the method further comprises:
dropping data corresponding to the third sector;
marking the third sector as defective or invalid; and
moving the current write pointer location to a next sequentially available sector of the identified track; and
wherein in response to determining that the third sector indicates invalid data, the method further comprises packing any valid data for subsequent copying in response to an initiation of a data recycling procedure.

17. The computer system of claim 10, wherein distributing the plurality of spare sector pools among the plurality of concentric tracks causes the storage device to access a respective spare sector pool corresponding to the selected track based on the access-frequency information.

18. The computer system of claim 10, wherein in response to an initiation of a data recycling procedure, the method further comprises:
identifying a valid sector with valid data which has been marked for subsequent copying; and
copying the valid data from the valid sector to the current write pointer location.

* * * * *